(12) United States Patent
Jordan et al.

(10) Patent No.: US 12,351,118 B1
(45) Date of Patent: Jul. 8, 2025

(54) ELECTRICAL DISTRIBUTION SYSTEM FOR PERSONAL WATER CRAFT AND RECREATIONAL VEHICLES

(71) Applicant: SOUTHERN AUDIO SERVICES, INC., Baton Rouge, LA (US)

(72) Inventors: Jeff B Jordan, Baton Rouge, LA (US); Jon C Jordan, Baton Rouge, LA (US)

(73) Assignee: SOUTHERN AUDIO SERVICES, INC, Baton Rouge, LA (US)

( * ) Notice: Subject to any disclaimer, the term of this patent is extended or adjusted under 35 U.S.C. 154(b) by 14 days.

(21) Appl. No.: 18/367,247

(22) Filed: Sep. 12, 2023

Related U.S. Application Data

(63) Continuation of application No. 17/458,866, filed on Aug. 27, 2021, now Pat. No. 11,752,957, which is a continuation of application No. 16/542,072, filed on Aug. 15, 2019, now Pat. No. 11,173,854, which is a continuation-in-part of application No. 15/886,792, filed on Feb. 1, 2018, now Pat. No. 10,723,419.

(60) Provisional application No. 62/453,236, filed on Feb. 1, 2017.

(51) Int. Cl.
*B60R 16/023* (2006.01)
*B62D 5/00* (2006.01)
*B63B 34/26* (2020.01)

(52) U.S. Cl.
CPC .......... *B60R 16/0238* (2013.01); *B62D 5/00* (2013.01); *B63B 34/26* (2020.02)

(58) Field of Classification Search
CPC ........ B60R 16/0238; B63B 34/26; B62D 5/00
USPC ......................................................... 307/9.1
See application file for complete search history.

(56) References Cited

U.S. PATENT DOCUMENTS

2005/0161974 A1* 7/2005 Atcravi ..................... B60P 3/34
296/164

* cited by examiner

*Primary Examiner* — Hal Kaplan
(74) *Attorney, Agent, or Firm* — ROY KIESEL FORD DOODY & NORTH, APLC

(57) ABSTRACT

An electrical distribution system for personal water craft. The primary components include a digital switching device; a series of power lines; and one or more remote controls, a control panel, or both. The digital switching device is preferably a bank of solid state relay switches controlled by an MCU. The control panel also has an MCU. The control panel MCU communicates with the digital switching device MCU. This allows signals from the control panel to travel on a single communication cable to the digital switching device, significantly reducing the control panel footprint compared to prior art control panels. When a radio frequency (RF) receiver is provided, the electrical distribution system may receive signals from a remote control. The remote control may be utilized in addition to or in lieu of the control panel. Power lines run from the digital switching device to wherever power is desired in the vessel.

30 Claims, 32 Drawing Sheets

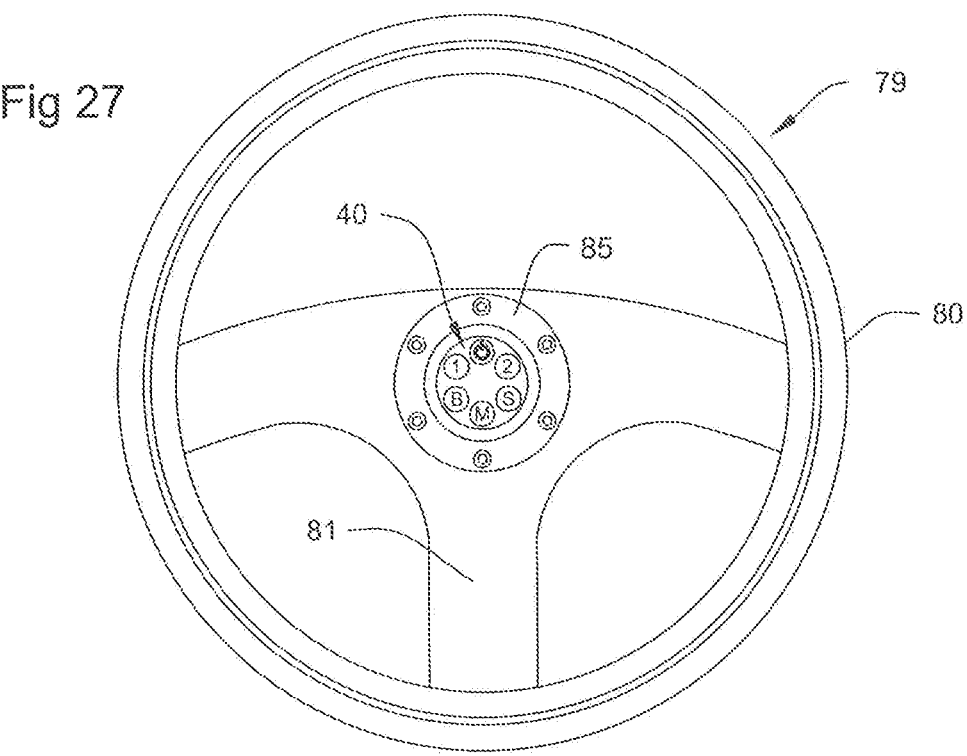
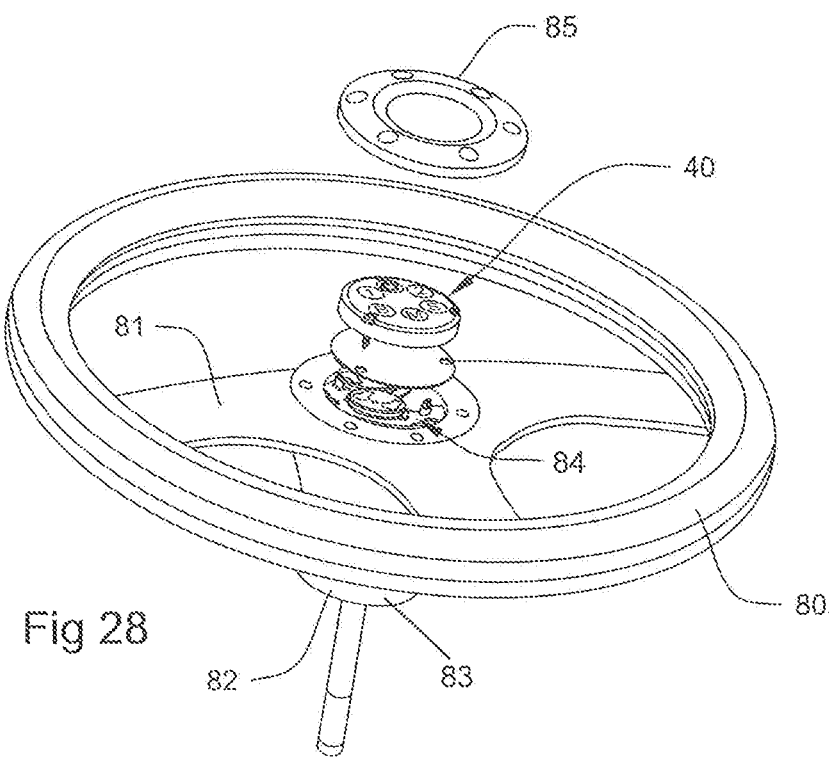

ELECTRICAL DISTRIBUTION SYSTEM FOR PERSONAL WATER CRAFT AND RECREATIONAL VEHICLES

PRIORITY CLAIM

This application claims benefit of provisional U.S. Patent Appln. No. 62/453,236, filed Feb. 1, 2017, U.S. patent application Ser. No. 15/886,792 filed on Feb. 1, 2018, which is now U.S. Pat. No. 10,723,419, and U.S. patent application Ser. No. 16/542,072 filed on Aug. 15, 2019, which is now U.S. Pat. No. 11,173,854, and U.S. patent application Ser. No. 17/458,866 filed on Aug. 27, 2021 whis is now U.S. Pat. No. 11,752,957, all of which are hereby incorporated by reference in their entirety.

BACKGROUND OF THE INVENTION

Field of the Invention: The invention relates to electrical control and distribution systems in general and to electrical control and distribution systems designed for use in kayaks and other personal water craft, as well as, in recreational vehicles such as ATVs and RVs, in particular.

Prior Art: Small, personal water craft, such as kayaks are quite popular. They allow boaters the opportunity to reach shallow waters, difficult to access with larger craft. One of the features of the kayak that allows them to reach otherwise inaccessible waters is their small size and slight draft. That advantage becomes a disadvantage if the user desires to provide any electrically powered additions to the water craft. Space is at a premium in most kayaks. If the operator wishes to carry food and drink, fishing and/or photographic equipment, or camping and other gear, the boats can become decidedly cramped. Having wires running through the areas of the vessel intended for the operator and/or cargo is not desirable. Similarly, any electrical system in a kayak should be easily controllable. Operators need to be able to control the electrical components from where they are. If the operator is sitting, he should be able to control all of the electrical elements without having to scramble around the vessel. If the operator is standing, he should be able to control the electrical elements without having to sit or squat in the boat. Moving from a standing to a sitting position should be minimized, as each such transition increases the risk of a fall into the water.

Most kayaks are molded plastic, typically with a double wall that creates a hollow interior. They arrive sealed and the hollow interior must remain sealed to preserve the kayak's buoyancy. However, the hollow interior offers a natural space for running wires for electrical distribution. Having an electrical distribution system that allows for after-market installation within the hollow interior while maintaining the water-tight configuration of the hull is desirable.

Kayaks offer transportation on excursions that are usually necessarily minimalist in terms of gear. Batteries are heavy. Accordingly, additional batteries are often not something that can be carried easily. Likewise, a generator or recharging device will seldom be available. Solar recharging devices are possible, but solar charging is slow. Electrical distribution systems that minimize loss of electrical power is, therefore, another desirable feature.

In ATVs and RVs it is desirable that controls for the various powered accessories of the ATV or RV can be easily accessed by the driver. It is further desirable that the electrical and distribution control systems can be easily retrofitted into existing ATVs and RVs. It is still further desirable that these control systems can be installed with minimum wiring and positioned to minimize interference with existing systems of the ATVs and RVs.

OBJECTS OF THE INVENTION

It is an object of the invention to provide an electrical distribution system that can be used in small water craft and other applications where space is at a premium.

It is another object of the invention to provide an electrical distribution system with a minimal footprint.

It is still another object of the invention to provide an electrical distribution system that is easy to install.

It is yet another object of the invention to provide an electrical distribution system that can be installed without compromising the integrity of a vessel with respect to water-tightness.

It is still another object of the invention to provide an electric distribution system that can be controlled remotely.

It is yet another object of the invention to provide an electronic distribution system that can easily synchronize with remote electronics for remote control of the system via the remote electronic device.

It is still another object of the invention to minimize parasitic loss of electrical charge when the electronic distribution system is not in use.

It is yet another object of the invention to provide a means for mounting electrical ports on the exterior hulls of vessels that maintains the integrity of the hull.

It is another object of the invention to provide a Bluetooth or WiFi enabled digital switching system that can be controlled by an app.

It is another object of the invention to provide a digital electronic controller that can be mounted in a steering wheel of a recreational vehicle or affixed to a mount constructed to be attached to a recreational water vessel without impacting the waterproof integrity of the recreational water vessel.

It is still another object of the invention to provide a digital switching system for use in a conventional RV or motor home or trailer home that reduces the wiring required and requires less power to activate the various electrical and motor driven components of the RV.

These and other objects and purposes of the invention shall become apparent from the ensuing descriptions of the invention.

SUMMARY OF THE INVENTION

An electrical distribution system is disclosed. The primary components include a digital switching device, a series of power lines and either a control panel, at least one remote control device or both a control panel and one or more remote control devices. The digital switching device is preferably a bank of solid state relay switches controlled by a microcontroller or MCU. The control panel is also provided with an MCU. The MCU on the control panel communicates with the MCU in the digital switching device. This allows the signals from the control panel to be carried on a single communication cable to the digital switching device. That means there need only be one wire connecting the control panel to the digital switching device, significantly reducing the footprint of the control panel compared to prior art control panels. When a radio frequency (RF) receiver is provided, the electrical distribution system may receive signals from a remote control. Those signals will be transmitted to the MCU in the digital switching device, allowing the remote to control the relay bank in the same manner as the control panel. The remote control may be utilized in addition to or in lieu of the control panel. It is preferred that radio frequency be selected to accommodate use of Bluetooth devices. By utilizing Bluetooth or other similar protocols, the RF receiver may synchronize with third party electronic devices such as smart phones to allow the control signals to be sent from the third party electronic device to the RF receiver, which will then transmit them to the MCU in the digital switching device. Power lines run from the digital switching device to the various locations where power is desired. Quick connections between the power lines and the digital switching device make installation of the power lines easy to accomplish. An outlet configured to form a water tight seal with the hull exterior is also disclosed. In another aspect of the invention an app installed in a smart phone or hard drive can be used to control the functions of the digital switching system. In a preferred embodiment the digital switching system is contructed to only permit activation of one motor driven component at a time and to permit activation of another motor driven component only when the first motor driven component action has been completed.

BRIEF DESCRIPTION OF THE DRAWINGS

FIG. 27 is a frontal view of the wireless keypad controller affixed to the steering wheel used in number of vehicles, such as golf carts, recreational vehicles (RVs) and similar vehicles.

FIG. 28 is an exploded view of a steering wheel having the wireless keypad controller affixed to the center axis of the steering wheel.

Figure 1:
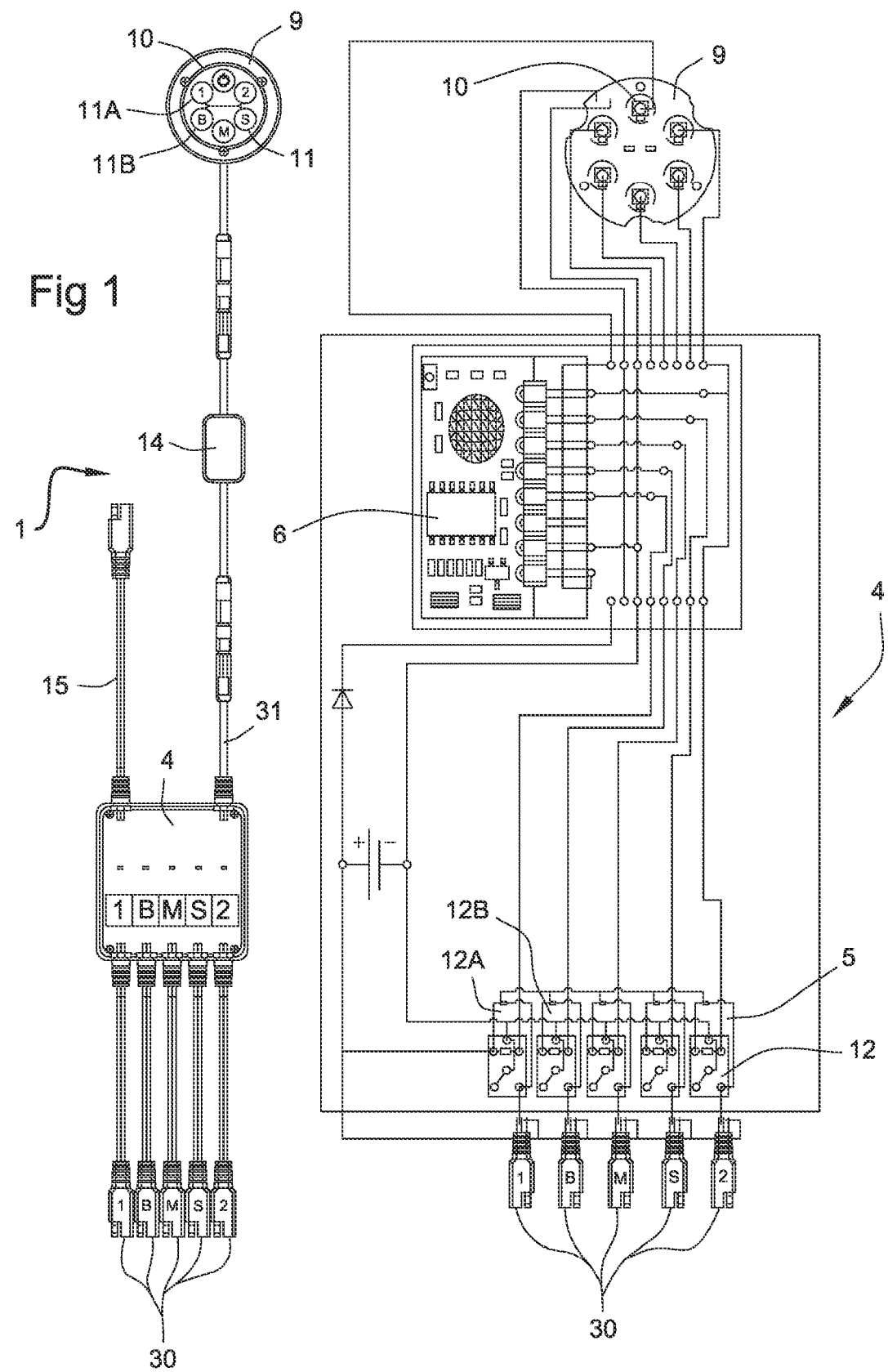
FIG. 1 is a schematic view of a preferred embodiment of the electrical distribution system.
Figure 2:
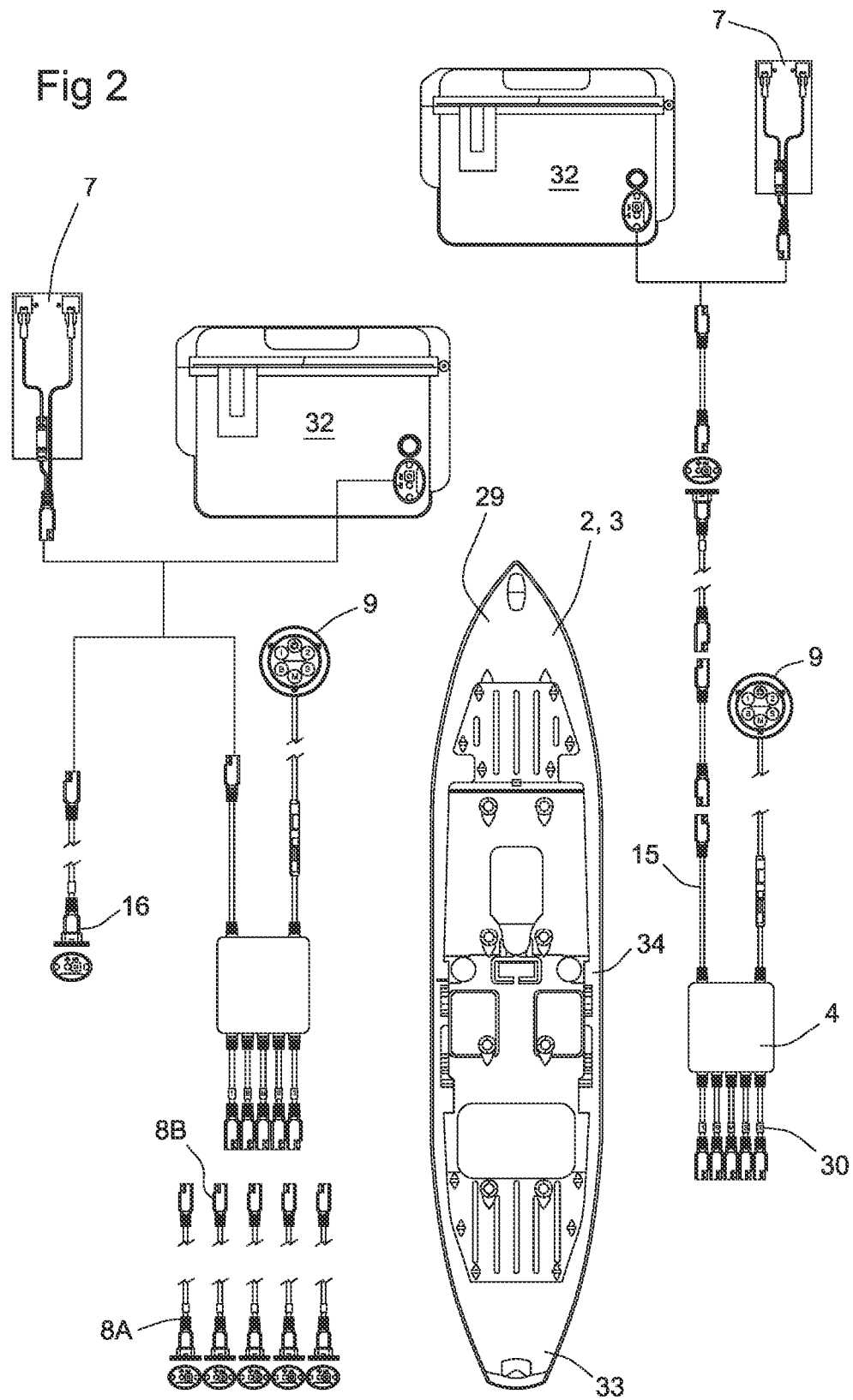
FIG. 2 is a schematic view illustrating installation of a preferred embodiment of the electrical distribution system in a kayak.
Figure 3:
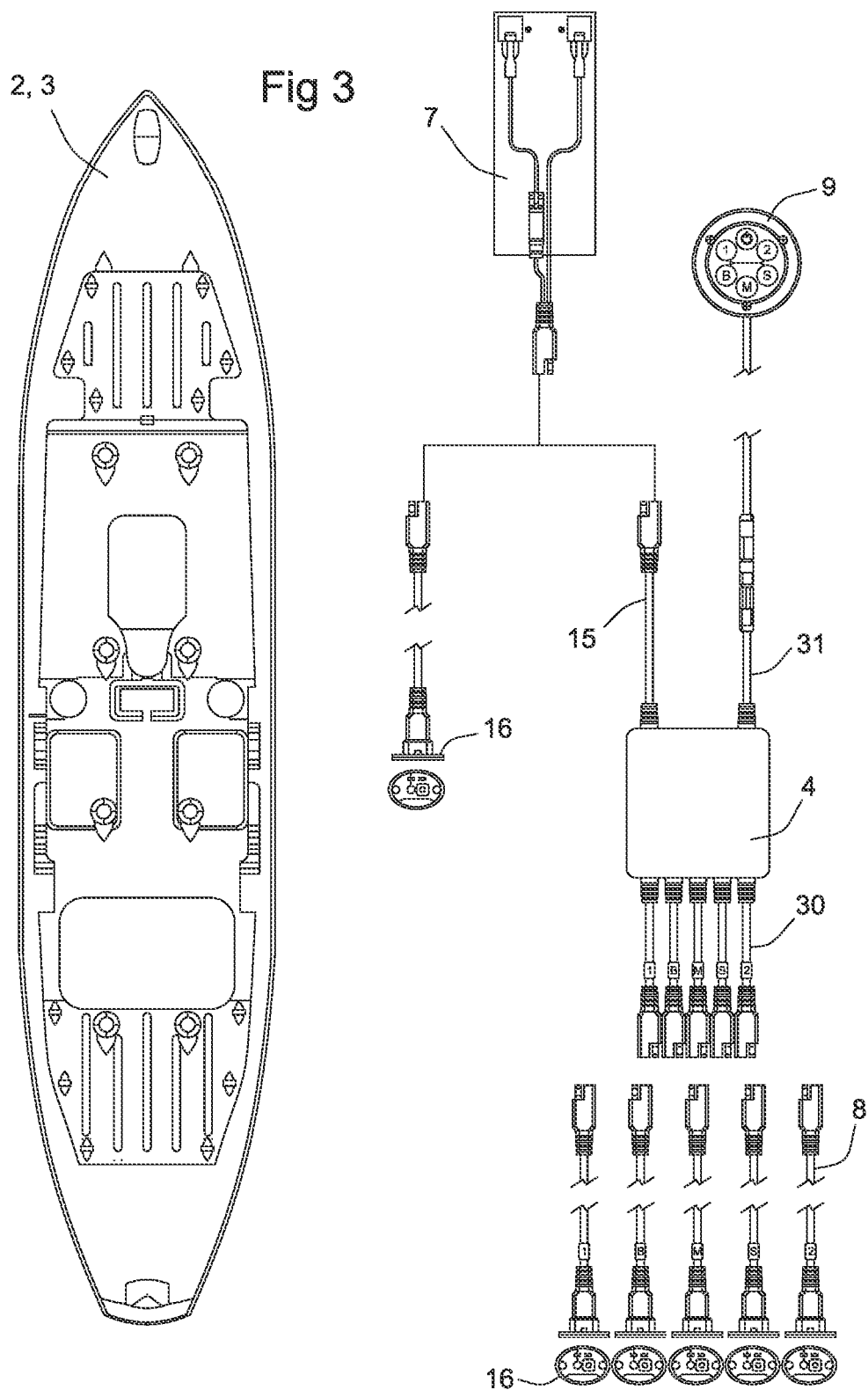
FIG. 3 is a schematic view illustrating installation of a preferred embodiment the electrical system in a vessel positioning the battery in the hull of a vessel.
Figure 4:
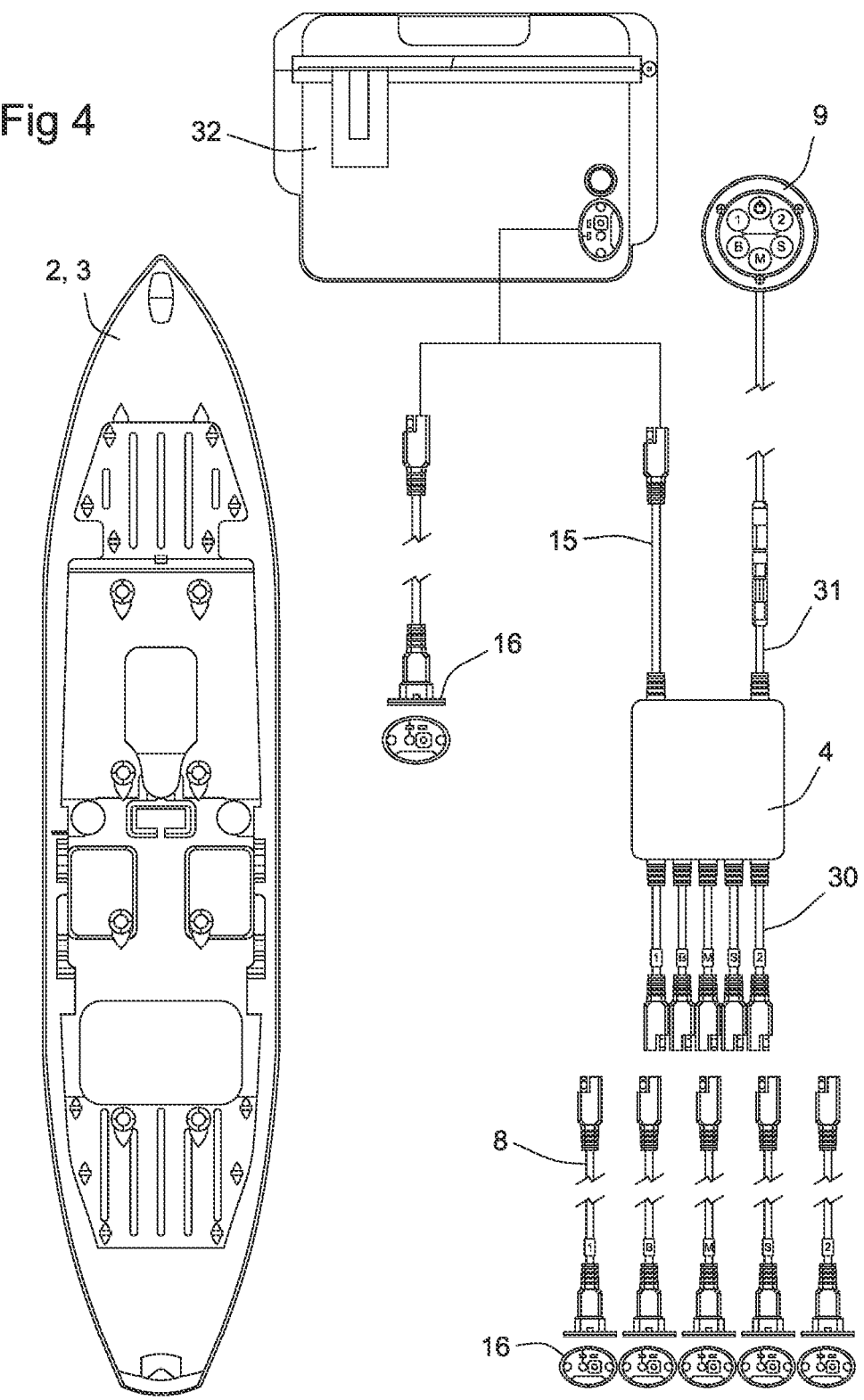
FIG. 4 is a schematic view illustrating installation of a preferred embodiment of the electrical system using a battery box in the hull of a vessel.
Figure 5:
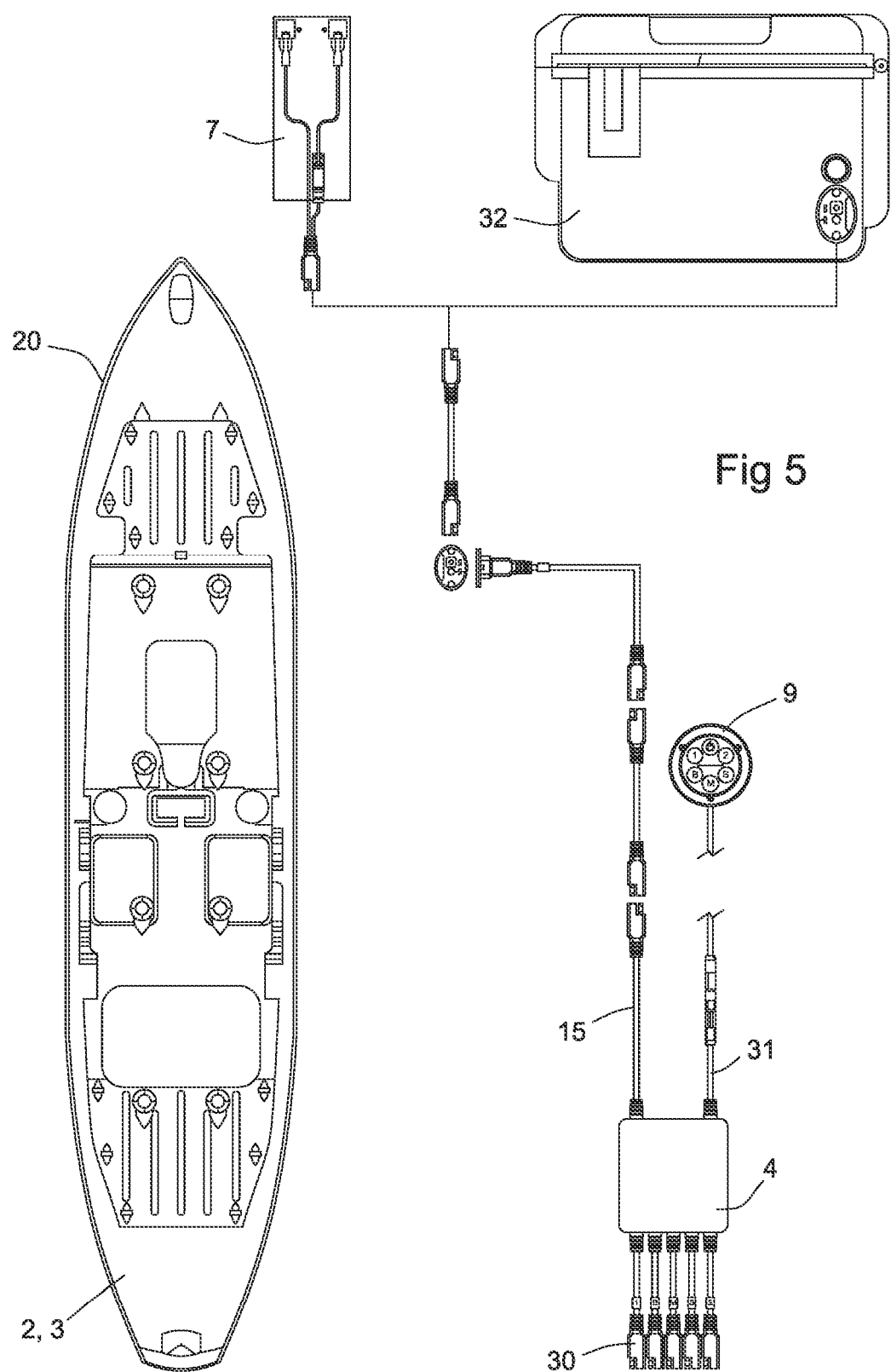
FIG. 5 is a schematic view illustrating installation of a preferred embodiment of the electrical system using a battery box outside the hull of a vessel.
Figure 6:
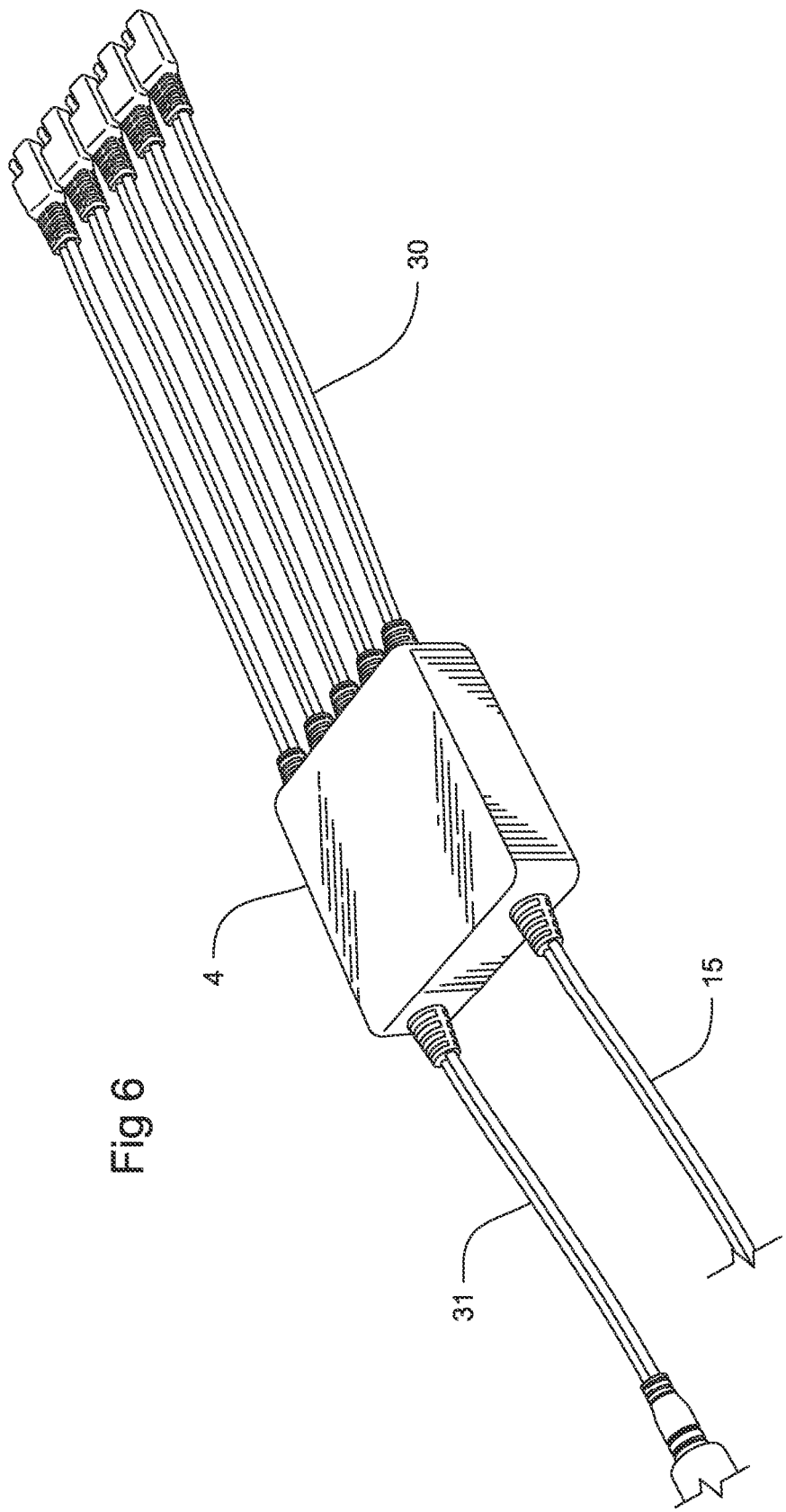
FIG. 6 is a perspective view of a preferred embodiment of the digital switching device and cables extending therefrom.
Figure 7:
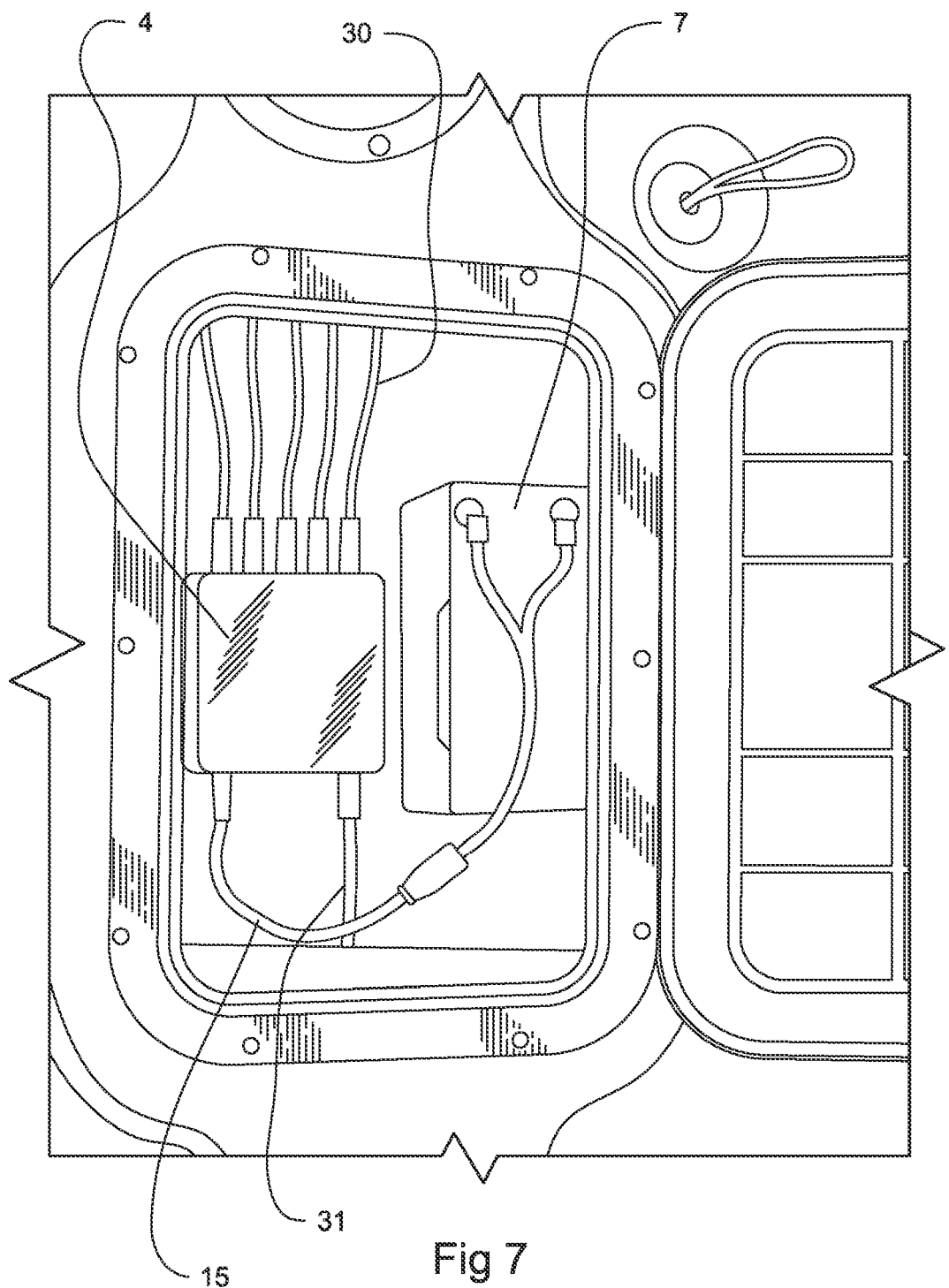
FIG. 7 is a plan view of a preferred embodiment of the digital switching device installed in the hull of a vessel adjacent to a battery.
Figure 8:
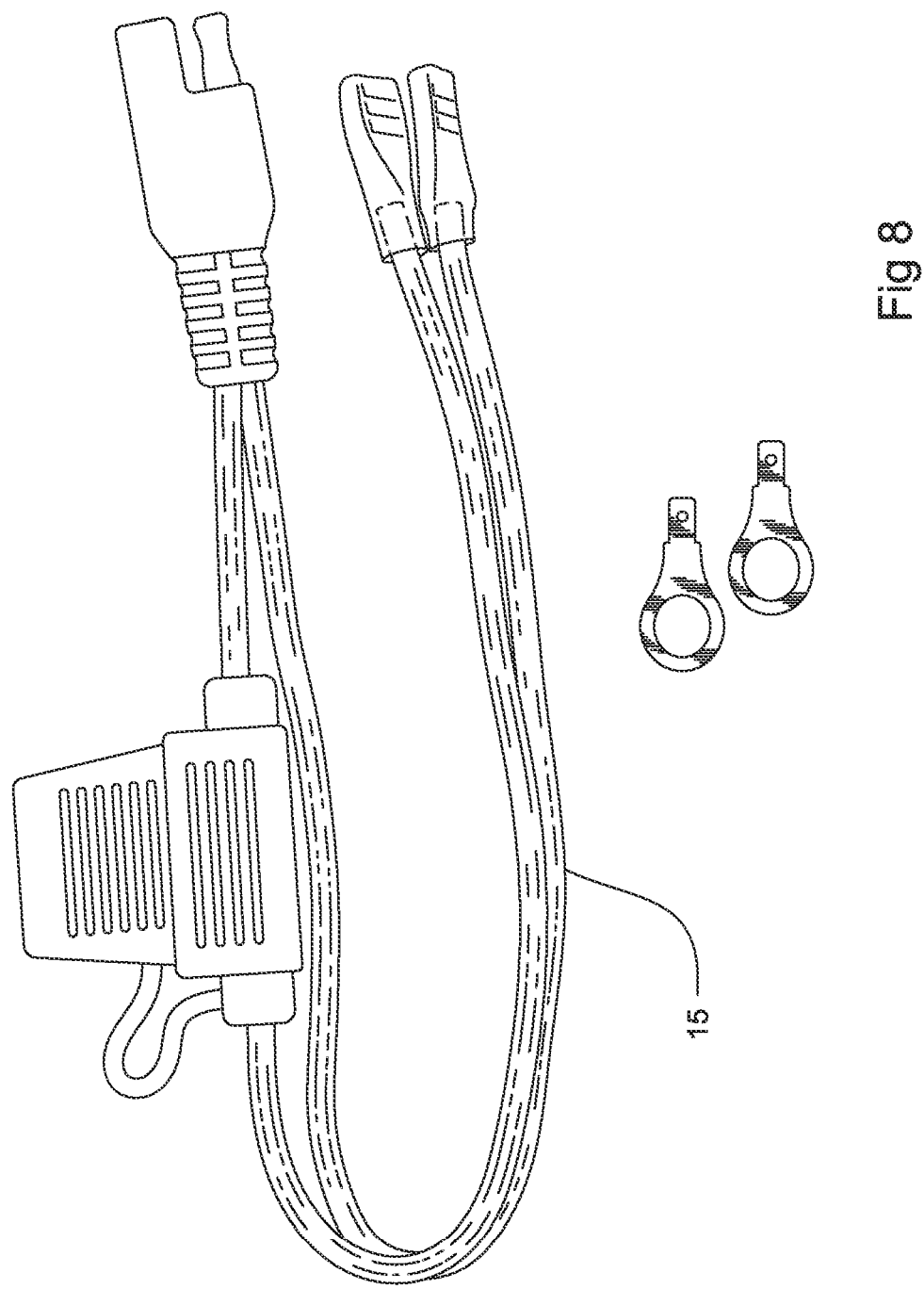
FIG. 8 is a perspective view of a preferred embodiment of a power cable.
Figure 9:
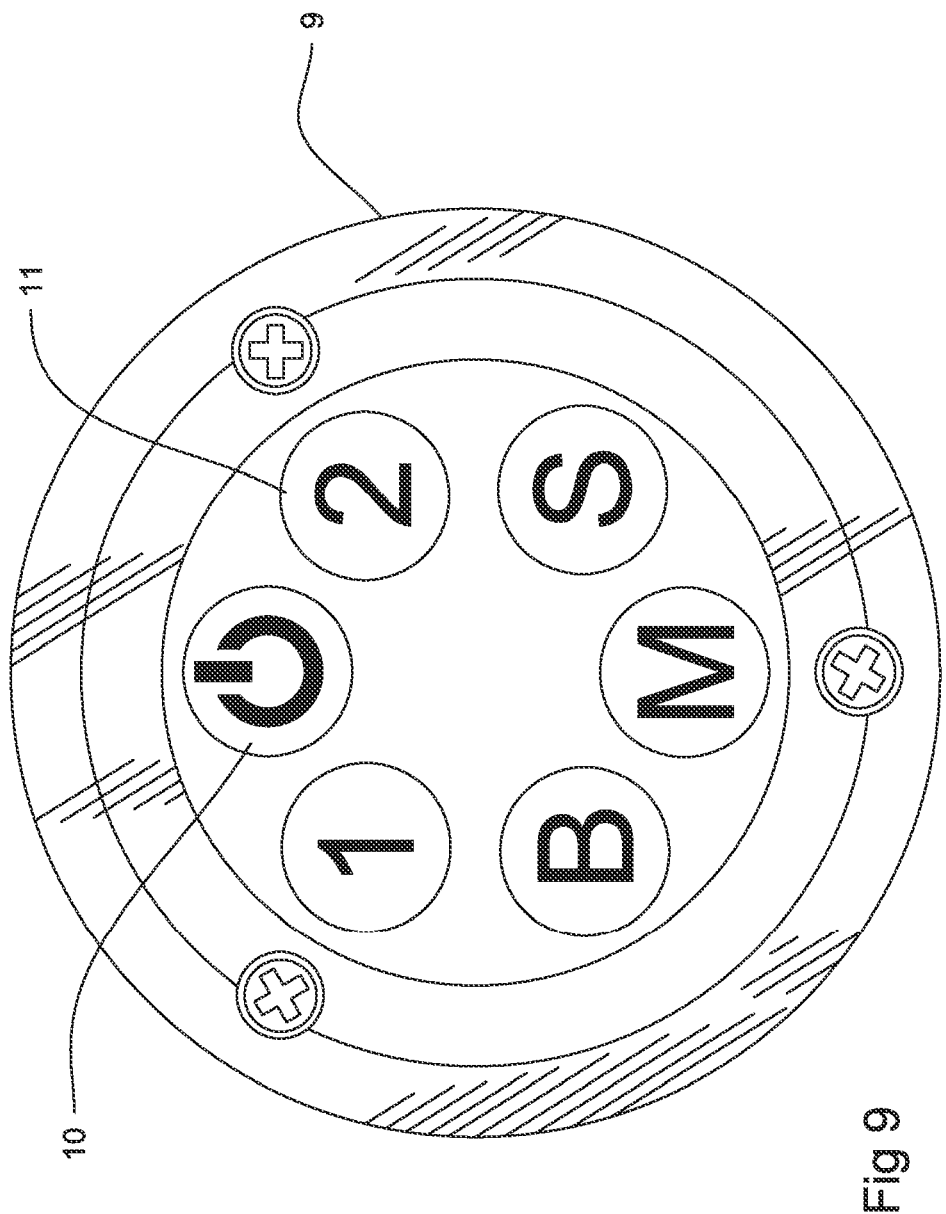
FIG. 9 is a plan view of a preferred embodiment of a control panel.
Figure 10:
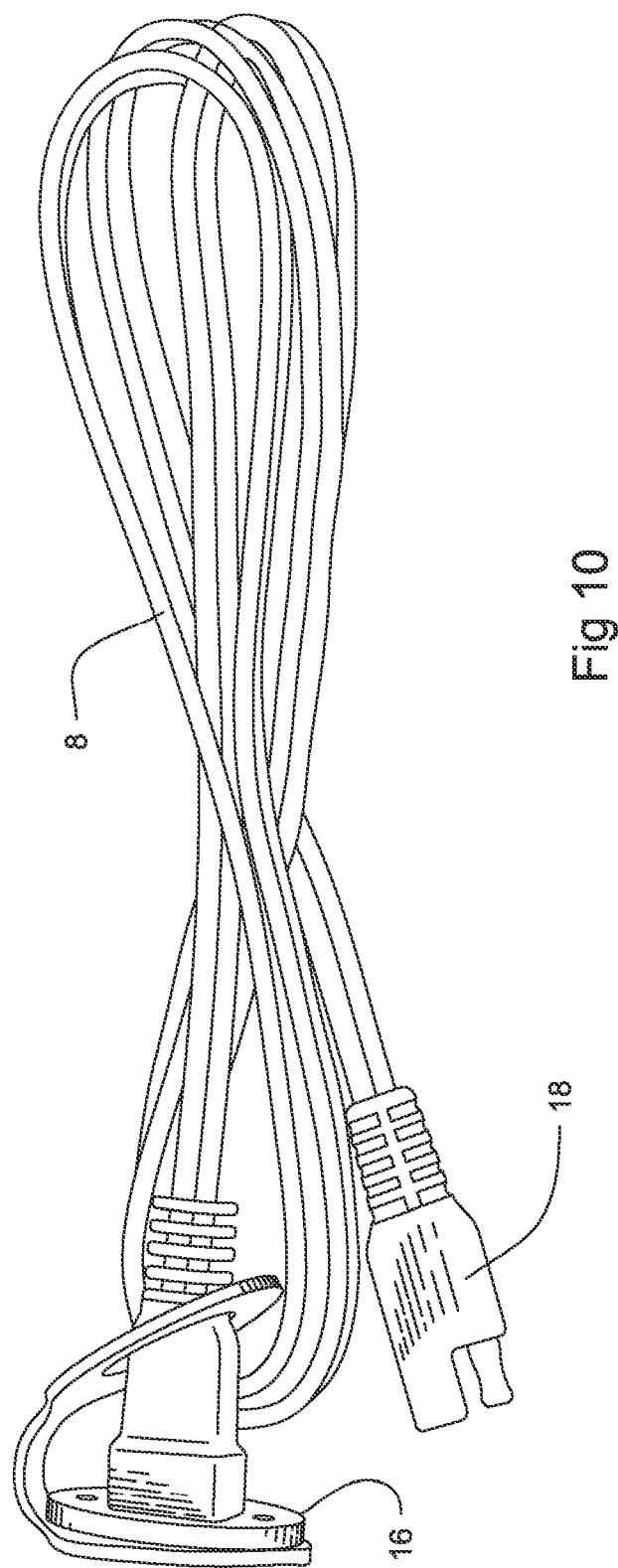
FIG. 10 is a perspective view of a preferred embodiment of a power line, shown coiled.
Figure 11:
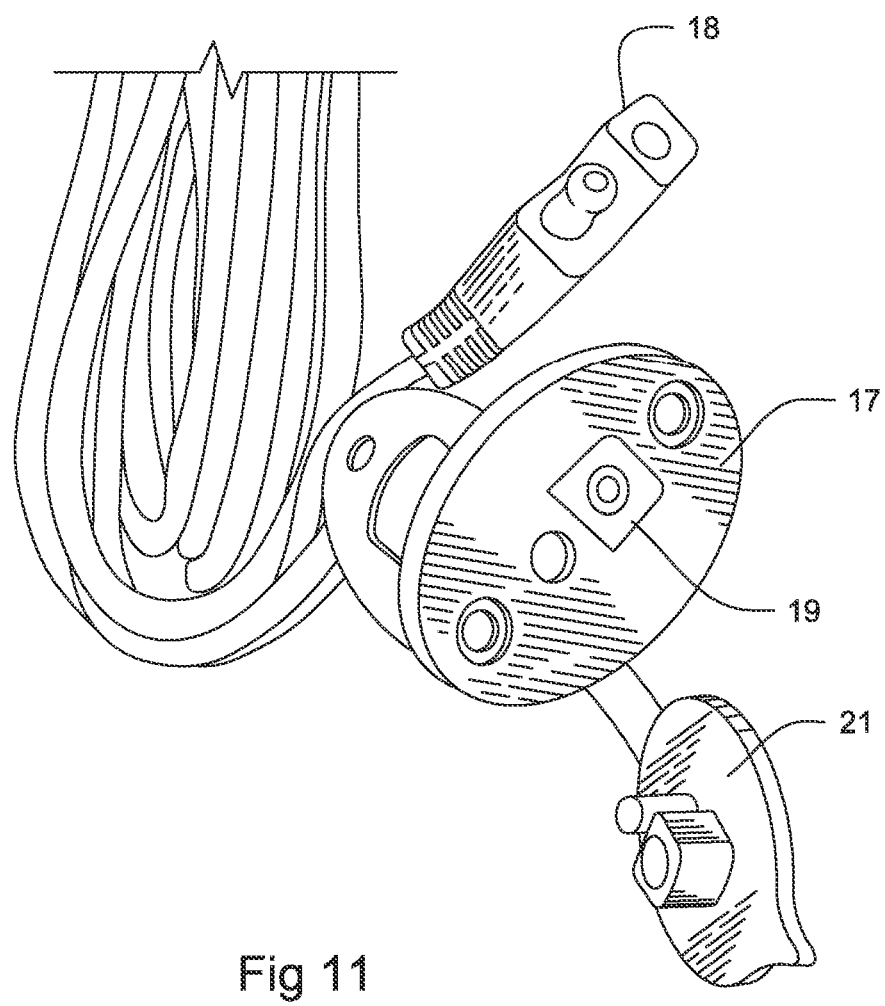
FIG. 11 is a plan view of a preferred embodiment of a receptacle attached to a power line.
Figure 12:
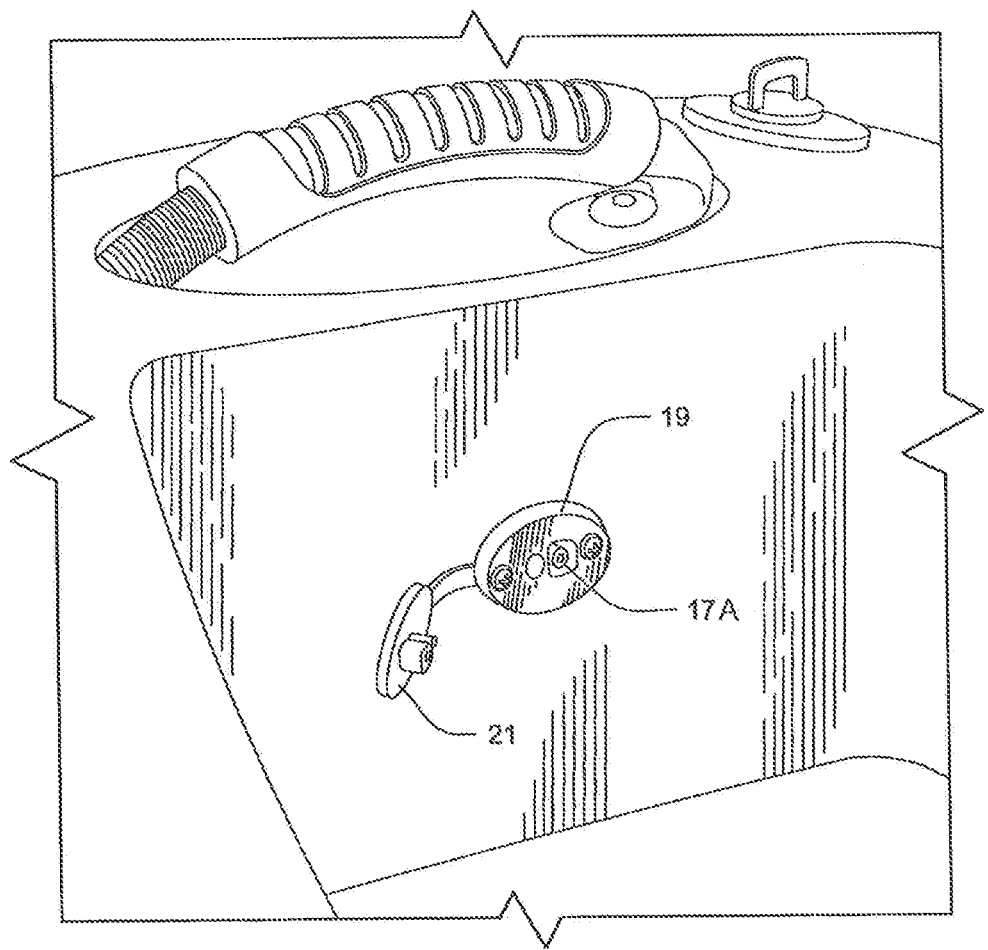
FIG. 12 is a perspective view of a preferred embodiment of a receptacle shown installed.
Figure 13:
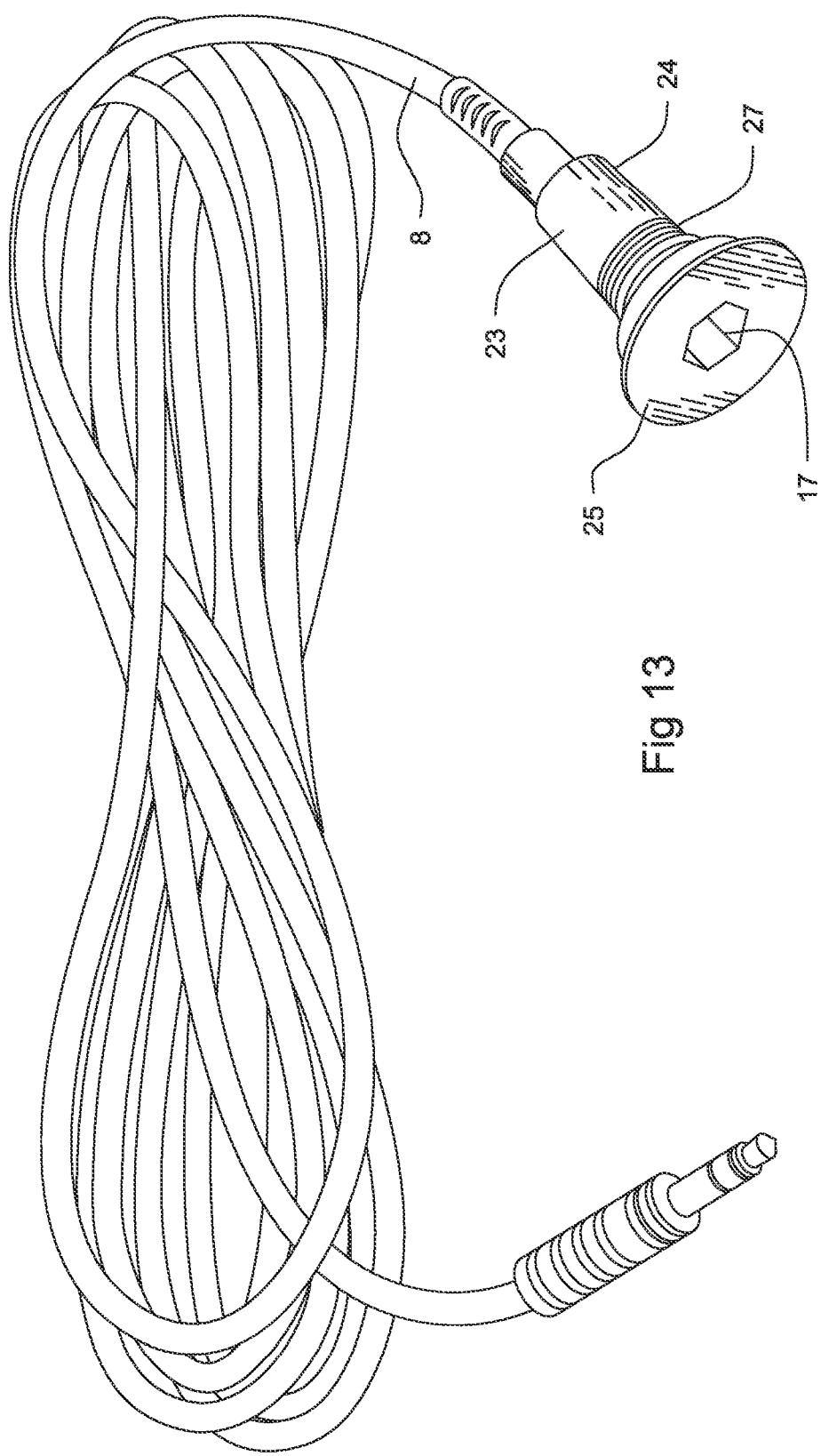
FIG. 13 is a perspective view of a preferred embodiment of a through hull receptacle attached to a power line.
Figure 14:
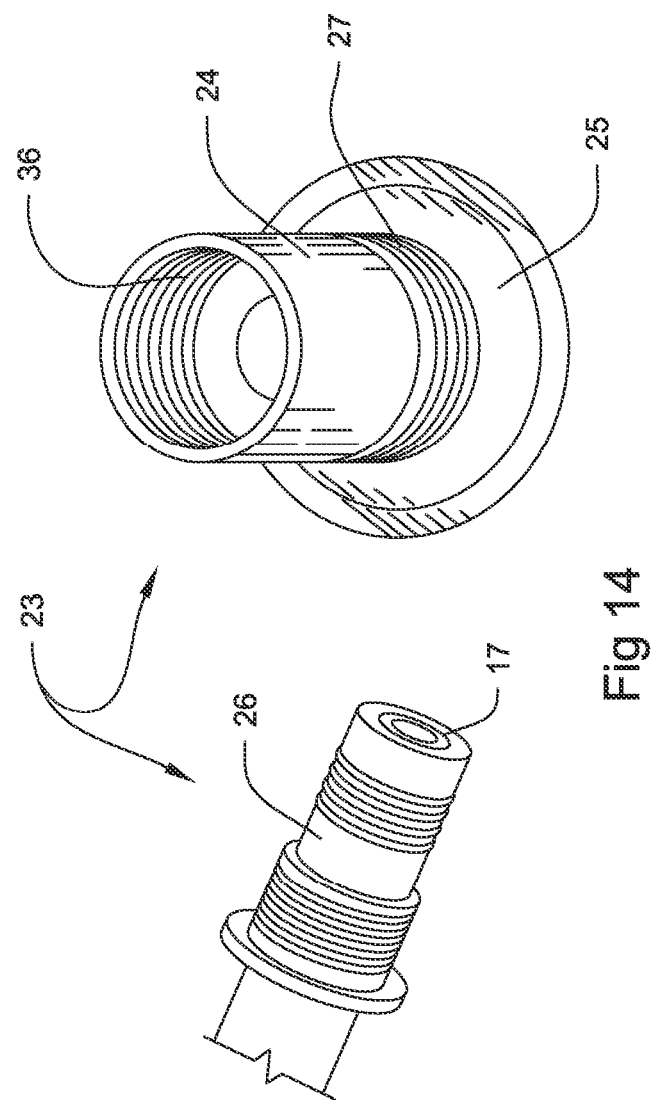
FIG. 14 is a perspective view of a preferred embodiment of a disassembled through hull receptacle.
Figure 15:
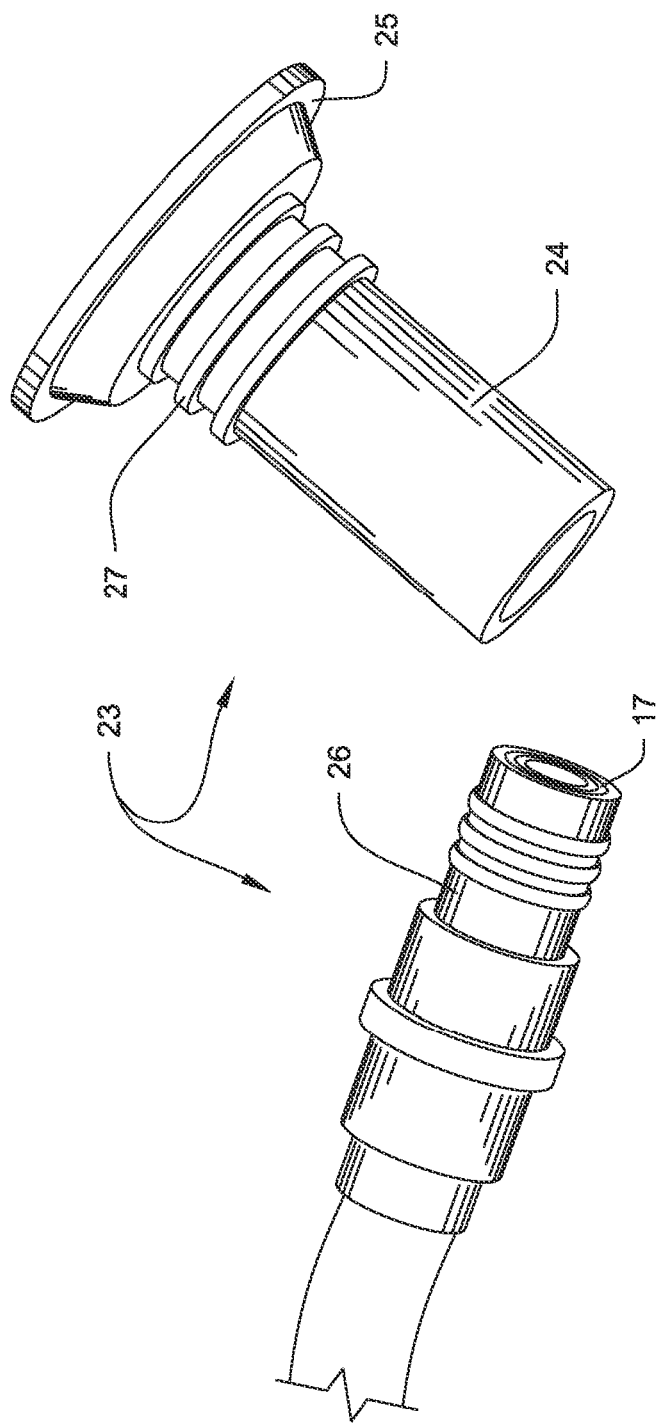
FIG. 15 is a side view of a preferred embodiment of a disassembled through hull receptacle.
Figure 16:
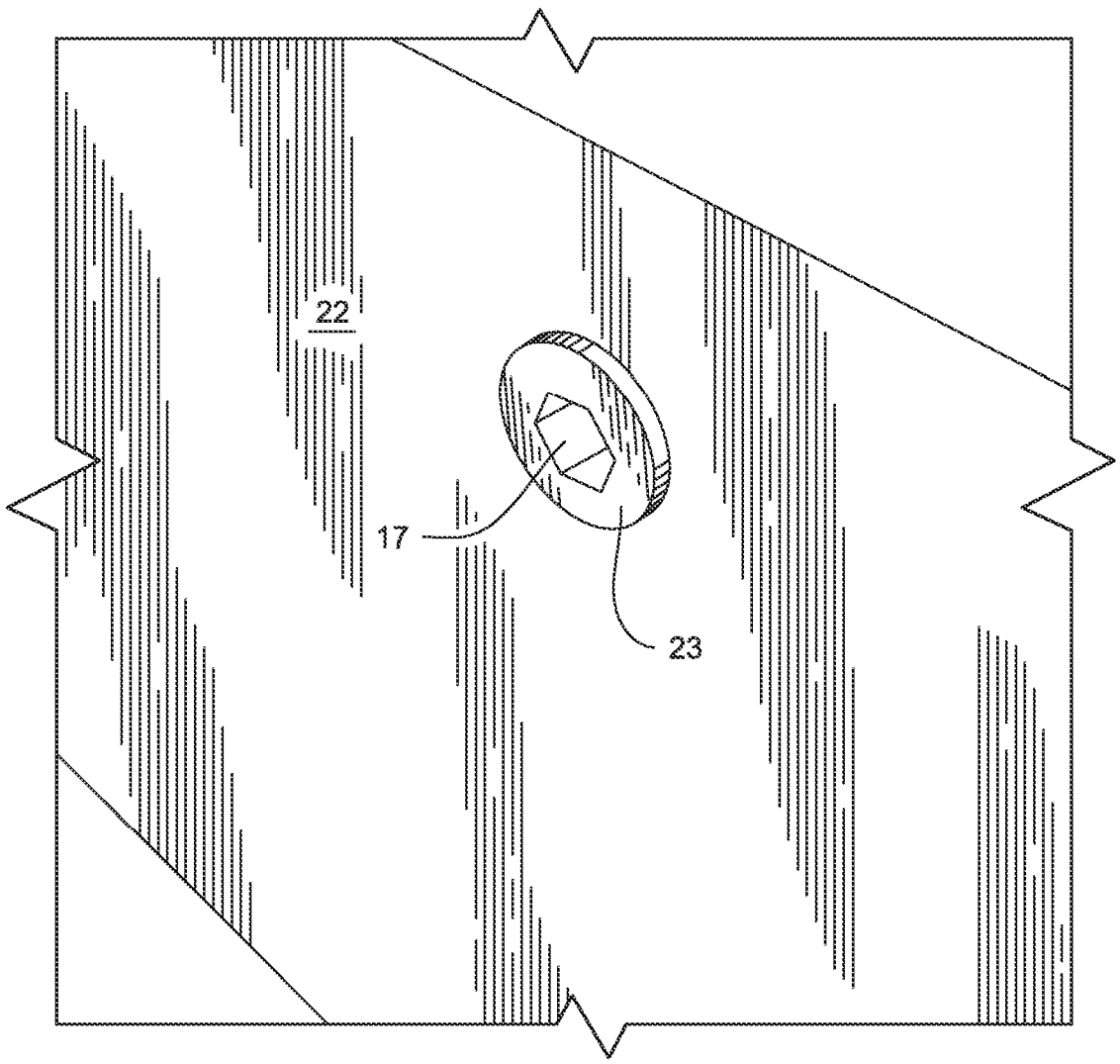
FIG. 16 is a perspective view of a preferred embodiment of a through hull receptacle installed.
Figure 17:
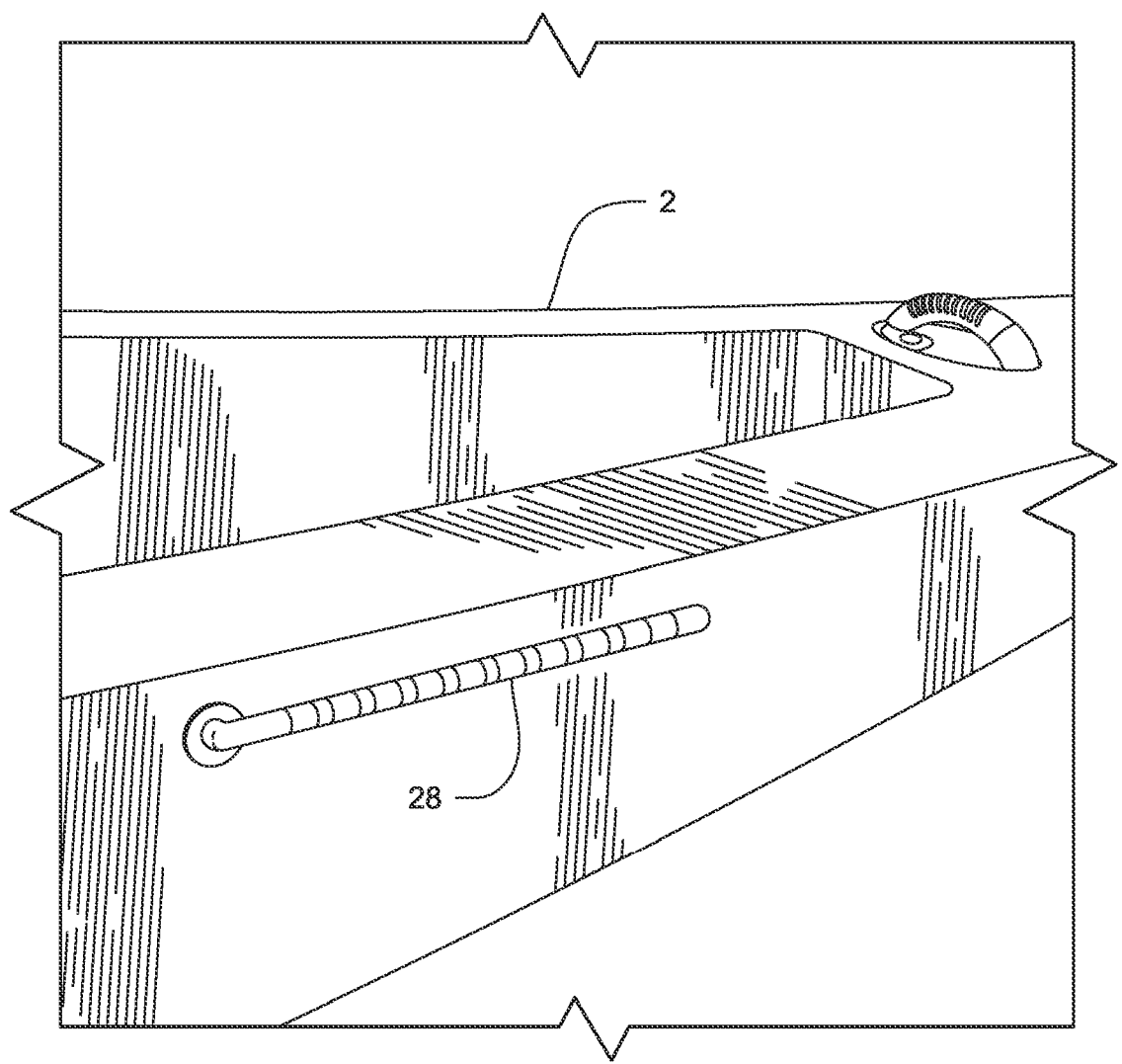
FIG. 17 is a perspective view of a preferred embodiment of an LED light strip installed in a through hull receptacle.
Figure 18:
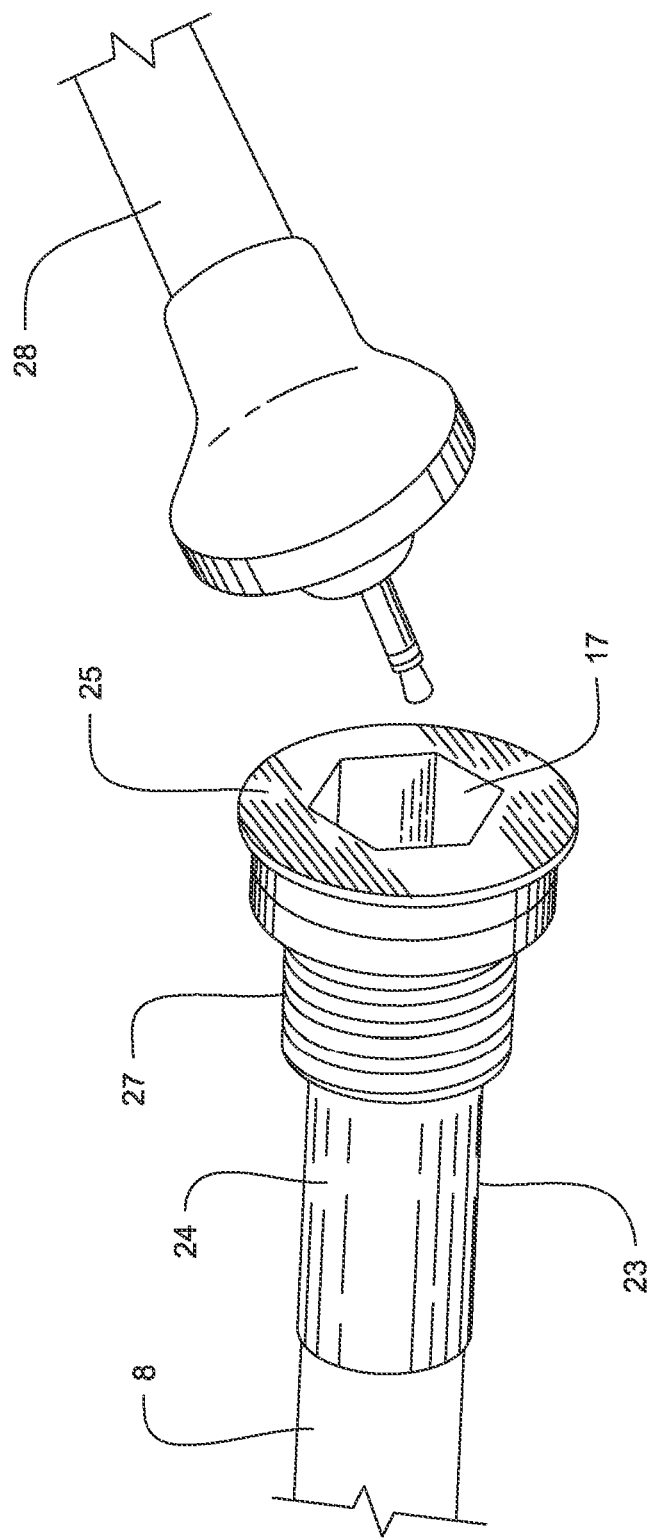
FIG. 18 is an exploded view of a preferred embodiment of an LED light strip and a through hull receptacle.
Figures 19, 20:
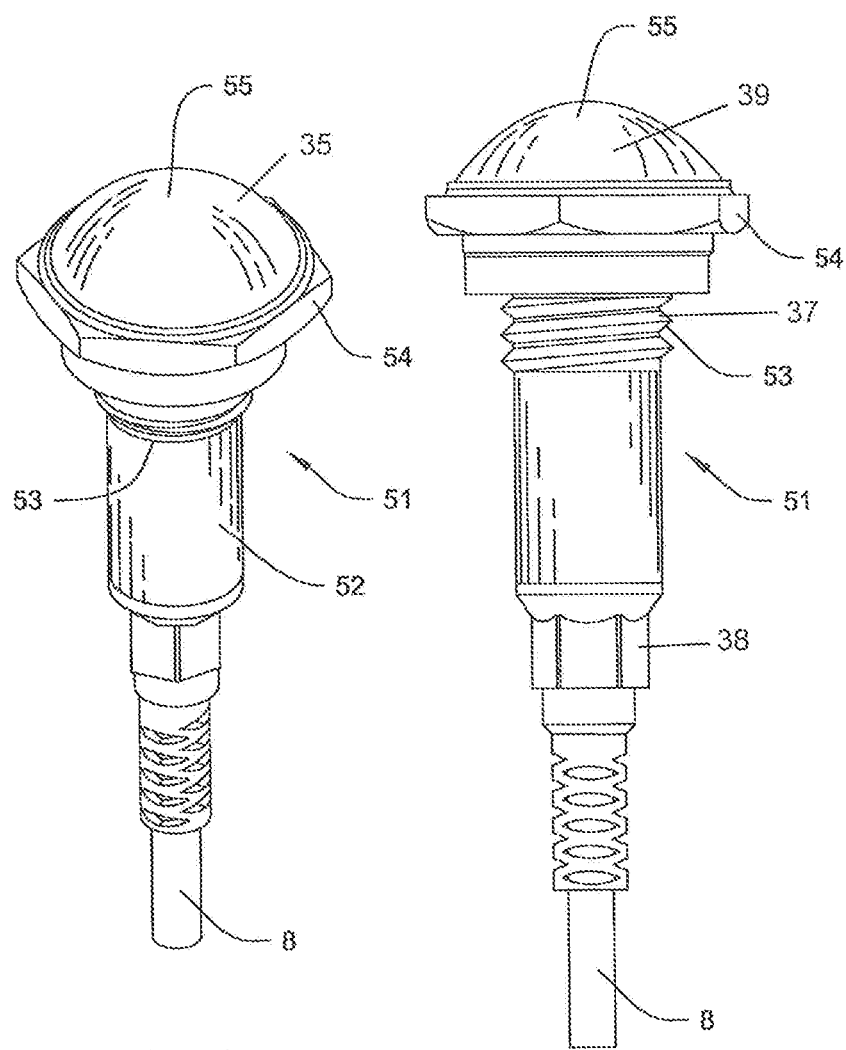
FIG. 19 is a perspective view of a preferred embodiment of a button light.
FIG. 20 is a side view of a preferred embodiment of a button light.
Figure 21:
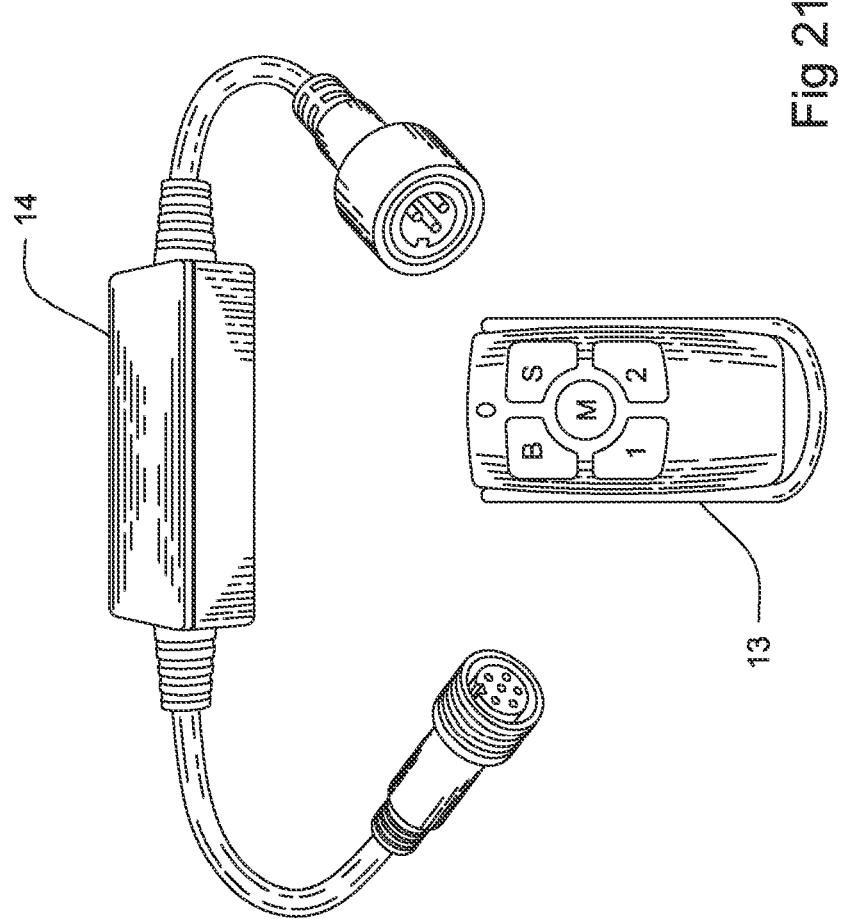
FIG. 21 is a perspective view of a preferred embodiment of a remote control and a radio frequency receiver.

Disclosure of the Best Mode of the Invention

The invention comprises an electrical distribution system 1 designed particularly for kayaks 2 and other personal water craft 3, as well as certain land vehicles such as RVs, golf carts, and similar recreational vehicles. The system can also be adapted for use on mobile homes and similar structures. System 1 includes a digital switching device 4. Digital switching device 4 is preferably a solid state relay switch bank 5 with a microcontroller unit (MCU) 6. An MCU 6 is essentially a mini-processor contained on a single chip. In the preferred embodiment it is configured to transfer 12 volt power from a battery 7 to a plurality of power lines 8. In the preferred embodiment there are five power lines 8, though greater or fewer could be provided as desired.

A control panel 9 is also provided. Control panel 9 is electrically connected to relay switch bank 5. Control panel 9 is provided with a master power switch 10, which when deactivated powers off the entire system 1. Control panel 9 is provided with a separate switch 11 for each relay 12 within bank 5. Moving the first switch 11A to its on position activates the first relay 12A which energizes the first power line 8A. Moving the second switch 11B to its on position activates the second relay 12B, energizing the second power line 8B and so forth. Moving switches 11 to their off position will deactivate the associated relay 12 and de-energize the associated power line 8. Though described as switches, the controls on control panel 9 may be buttons. The terms are used interchangeably herein.

Control panel 9 is preferably also provided with an MCU 6. The use of MCU's in control panel 9 and relay bank 5 will allow the footprint of the entire electrical distribution system 1 to be significantly reduced. In conventional marine electrical systems, each switch operates a separate circuit. Thus, a positive and a ground extend from each switch to the device being powered. A conventional control panel having only four switches would have eight power lines extending from the control panel. requiring a relatively large control panel for even simple electrical systems. Each of those wires and their connection to the switches on the control panel represent a potential point of corrosion, breakage, shortage, or failure. The MCU's allow each switch 11 in control panel 9 to send a signal to MCU 6. MCU 6 can then generate a digital signal that is transmitted to the corresponding MCU 6 in relay bank 5. The relay bank MCU 6 can interpret the signal from the control panel MCU 6 and generate a signal that will open or close each relay switch 12. Rather than eight wires extending from a four switch control panel, MCUs allow one wire to extend from control panel 9 to relay bank 5—regardless of whether control panel 9 has five switches or fifty. That translates into a much smaller control panel 9.

A remote control 13 is also preferably provided. Remote control 13 duplicates the function of control panel 9. It has a button for each relay switch 12 and a radio frequency (RF) transponder. Depressing a button on remote 13 will cause the transponder to generate a signal unique to each button. An RF receiver 14 is also provided in electrical communication with MCU 6 in relay bank 5. Receiver 14 receives the signal produced by the transponder, and generates a corresponding signal directed to relay bank MCU 6. Preferably, receiver 14 includes an MCU configured to generate the same signals as MCU 6 in control panel 9. Thus, the input to MCU 6 in relay bank 5 will be the same, regardless of whether the input originates at control panel 9 or remote control 13. Thus, depressing a button on remote 13 will cause the corresponding relay switch 12 to be activated and the associated power line 8 to be energized. Pressing it again will cause relay switch 12 and associated power line 8 to be deactivated and de-energized. Remote 13 and RF receiver 14 may be provided in addition to or in lieu of the control panel 9.

While the remote controls and RF receivers described herein are conventional radio frequency transponders and receivers, those of skill in the art will appreciate that Bluetooth or other wireless communication technologies could be used with equal effect and in much the same manner. Bluetooth receivers are particularly useful. The Bluetooth format would allow the electrical distribution system to be controlled by a variety of widely available Bluetooth compatible devices such as smart phones, depth finders, and GPS navigation systems.

Suitable control panels 9, digital switching devices 4, remote controls 13, and RF receivers 14 may be obtained from GEEETECH of F3, Bld 150 East Zone, Guan Long village, XinGao Road, Xili Town, Nanshan Dist. Shenzhen China 518000.

It will be appreciated that by configuring the master power switch 10 on control panel 9 to deactivate RF receiver 13, power may be conserved. Various devices attached to battery 7 can drain power, even when the devices are not being operated. This can be controlled by powering down the lines 8 to which the devices are connected when they are not in use. However, RF receiver 13 must stay activated in order to respond when remote signals are transmitted to receiver 13. This can be an insidious cause of battery drain, drawing down power even when all of lines 8 are powered down. Switching master power switch 10 to off will disconnect receiver 13 from battery 7 and prevent this power loss from happening.

Digital switching device 4 is preferably connected directly to battery 7. A fuse may be provided in a power cable 15 that connects battery 7 and digital switching device 4 to protect switching device 4 and the rest of system 1 from surges.

MCUs make grounding system 1 back to battery 7 simple. Each MCU 6 is connected to a single ground wire which may be run back to battery 7. Thus, regardless of the number of switches 11 or relays 12, only one ground wire is required.

Each of power lines 8 are preferably grounded to switching device 4 and connected to an outlet 16. Each outlet 16 is preferably provided with the receptacle design suitable for the type of device intended to be utilized. In a preferred embodiment, receptacles 17 are two way male and female receptacles 17A designed to mate with standard two way flat male and female connectors 18, though other outlets 16 may be used as desired. Receptacles 17 are preferably mounted in a hole that may be drilled into the hull 20. The hole is preferably sized so that power line 8 will fit through the hole but the receptacle housing 19 will not. Power line 8 can be passed through the hole and run within the hollow space in hull 20 of water craft 3 back toward the rear of the vessel 3 where digital switching device 4 will typically be mounted. Receptacle housing 19 may be screwed over the hole and may be provided with a seal or gasket to create a substantially water tight seal between housing 19 and the hole. A cover 21 is preferably provided to keep moisture out of receptacle 17.

Receptacles 17 discussed above are primarily intended to be used for outlets 16 positioned on the interior of vessel 3. However, it may be desirable to mount a receptacle 17 on an exterior surface 22 of hull 20. The inventors have developed a through hull receptacle 23 for this application. Through hull receptacle 23 comprises an internally and externally threaded insert 24, preferably generally cylindrical in shape and having an oversized head 25 at one end and an interior passage extending the length of insert 24. By drilling an appropriately sized hole in exterior surface 22 of vessel 3, through hull receptacle 23 may be installed. A power line 8 will be inserted through the opening and run, within the hollow space in hull 20, to or toward digital switching device 4. An appropriate receptacle 17 will be contained within an externally threaded, preferably cylindrical, housing 26. Housing 26 will be sized and configured to mate with the interior of insert 24. The two will be threaded together, though they may be joined by other conventional means or simply made as one piece. Once connected, insert 24 containing housing 26 and receptacle 17 will be inserted into the hole in hull 20. At this point, power line 8 will be inside the hull 20, insert 24 will be positioned in the hole and exterior, self-tapping threads 27 and oversized head 25 will be exterior to hull 20. By turning insert 24, threads 27 will bite into the plastic of hull 20, pulling insert 24 into the hole, forming a seal with hull 20, and pulling head 25 down into snug, substantially water-tight contact with the exterior surface 22 of vessel 3. If the user has access to the area behind insert 24, a nut may be screwed onto threads 27, which together with a washer or gasket, may be used to secure insert 24 to hull 20. However, when the user does not have access to the area behind insert 24, self-tapping threads 27 can secure insert 24 to hull 20 without a nut. A plug or cover may be provided for through hull receptacle 23 to keep moisture out of receptacle 17 when it is not in use.

Any conventional receptacle configuration may be utilized in through bull receptacle 23. A conventional 3.5 mm female stereo receptacle for a single plug or jack is disclosed. This is particularly advantageous when through hull receptacle 23 is threaded into hull 20. A stereo jack has no angularity. A device may be plugged into it the same way regardless of the orientation of the receptacle. This matters because the number of turns required to secure insert into hull 20 will depend upon the thickness of hull 20 and the length of threads 27. If receptacle 23 has no angularity, the user can simply stop turning when insert 24 is snug, instead of needing to turn it until receptacle 17 is in a desired orientation at the risk of stripping out the aperture.

One of the intended applications of receptacle 17 on exterior surface 22 of vessel 3 will be to power lights 28. Where LED lighting is used, and especially when color LED lighting is used, it may be desirable to have a four conductor 3.5 mm plug or jack to facilitate powering the color LED lights.

Another receptacle option would be a DC power connection. However, the particular receptacle configuration within insert 24 will depend on the intended application.

In another application, button lights 35 are provided. Button lights 35 preferably comprise an LED light 39 permanently attached to a through hull fitting 36. Through hull fitting 52 is preferably generally cylindrical in shape and is provided with external, self-tapping threads 37. The exterior of fitting 36 is provided with a nut 38 proximate light 39. Power line 8 extends from fitting 36 opposite light 39. Power line 8 may be threaded through an aperture in hull 20 and through hull fitting 36 inserted in the aperture. If the user can reach the inside of hull 20 where button light 39 is being installed, a nut may be tightened onto threads 37. If the user cannot reach the interior of hull 20, self-tapping threads 37 may be used to cut into the sides of the aperture, sealing fitting 36 to bull 20 and creating a water-tight connection in much the same manner as through hull receptacle 23, described above.

Once all of power lines 8 are run through the hollow interior of hull 20 to the rear or stern 29 of vessel 3, they will be attached to digital switching device 4. When kayak 2 or vessel 3 has a port that provides access to the interior of vessel 3, digital switching device 4 and power lines 8 will preferably be joined inside hull 20. Power lines 8 exiting digital switching device 4 are preferably provided with an easy to join connection configured to mate with a similar connection on the ends of power lines 8. In the preferred embodiment, standard two way flat male and female connectors 18 are provided, but any conventional connectors could be used. This allows for "plug and play" installation. Once power lines 8 are installed, they may be simply plugged into lines 30 extending from digital switching device 4, without splicing or other electrical manipulation.

Control panel 9 is installed in an interior hull wall in a similar manner to receptacles 17 described above. A communication line 31 extending from control panel 9 is also run within the hollow hull 20 back to digital switching device 4. In the preferred embodiment communication line 31 is a multi-pin cable which plugs into a mating cable extending from switching device 4. The requirements of communication line 31 are only that it carry minimal power to control panel 9, for example, enough to power MCU 6 and any display lighting provided on panel 9, and to carry signals from panel 9 to switching device 4. However, it will be advantageous to use a connection in communication line 31 that differs from the other connections to switching device 4 to ensure that the correct lines are connected to panel 9.

Finally, digital switching device 4 will be connected, via a power cable 15, to a battery 7 or series of batteries 7 positioned within hull 20. If hull 20 is not provided with an access port, battery 7 and digital switching device 4 will typically be housed in a storage area near stern 29 of vessel 3, but external to hull 20. Battery or batteries 7 will either be secured directly to the deck of vessel 3 or contained within a box 32 that is secured to the deck. Digital switching device 4 will be positioned proximate to battery 7, and power lines 8 run though the interior of hull 20 will exit via a single aperture formed in the deck of hull 20 proximate digital switching device 4 and connected to it. A wiring harness may be provided to facilitate this connection.

Once all power lines 8 and control panel 9 have been installed and connected to digital switching device 4 and digital switching device 4 has been connected to battery 7, the user may supply power to all portions of vessel 2. In one embodiment, control panel 9 is provided with controls for the bow 33, the mid-ship 34, stern 29, and innominate lines 1 and 2. Moving the appropriate switch 11 on control panel 9 to the on position will energize the lines 8 leading to bow 33, stern 29, mid-ship 34 of vessel 3 or wherever the user has elected to direct lines 1 or 2. This may turn on a bow light, a stern light, external LED lighting positioned amidship, a spot light, a depth finder, a navigation system, an electric trolling motor, a radio, or anything else the user elects to power. Similar control may be effected utilizing remote control 13 or other device connected via Bluetooth or similar communication protocol. The user may turn individual devices on or off by energizing or de-energizing the lines 8 to which the device is connected. When the user desires to turn off all of the power, master switch 10 may be moved to the off position and vessel 2 will be completely de-energized, thereby ensuring that battery life is preserved to the greatest extent possible.

Figure 22:
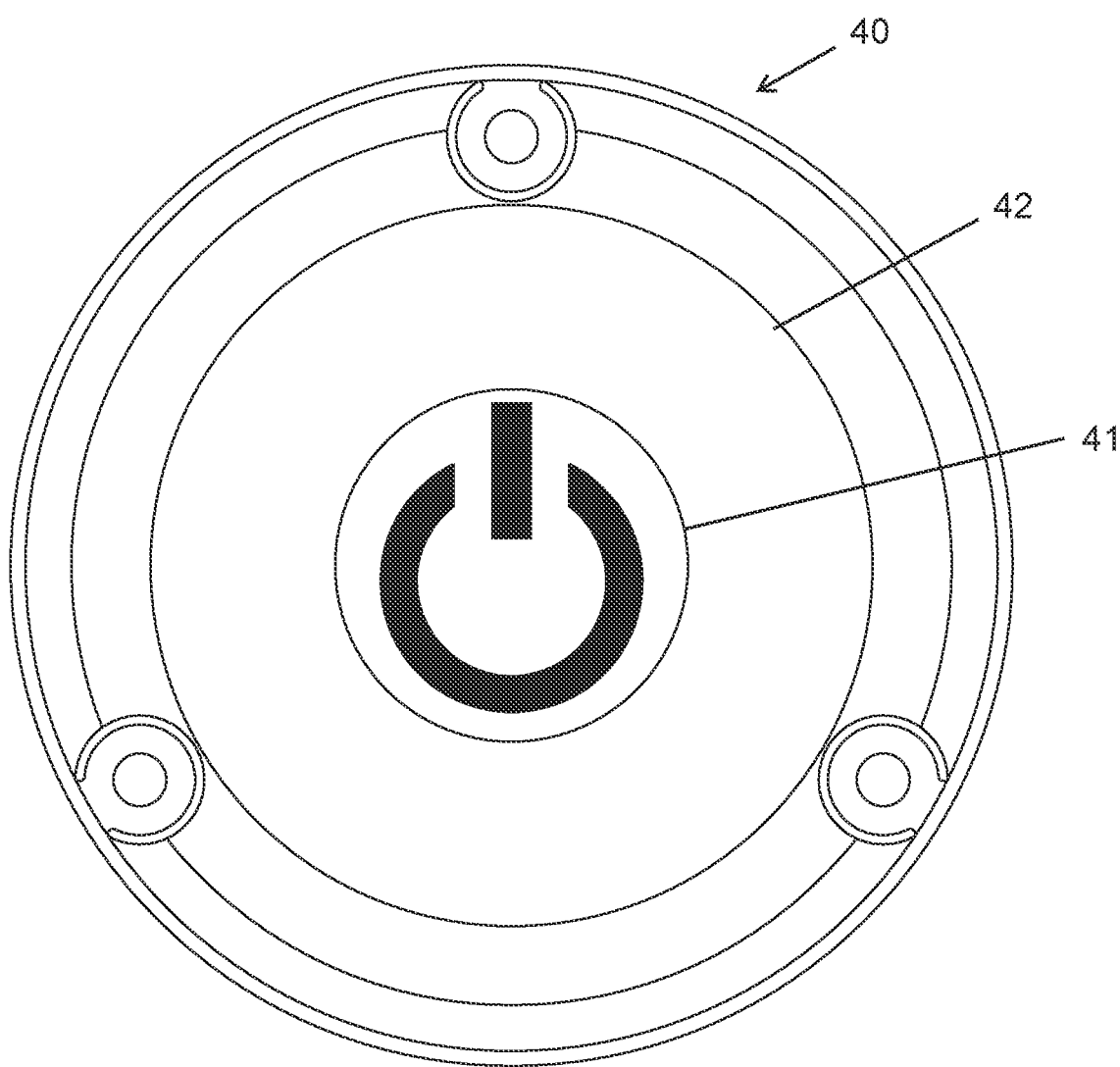
FIG. 22 is a top view of a preferred embodiment of the one button wireless keypaid controller that can be affixed to a mount for attaching to a water craft or recreational vehicle.
Figure 29:
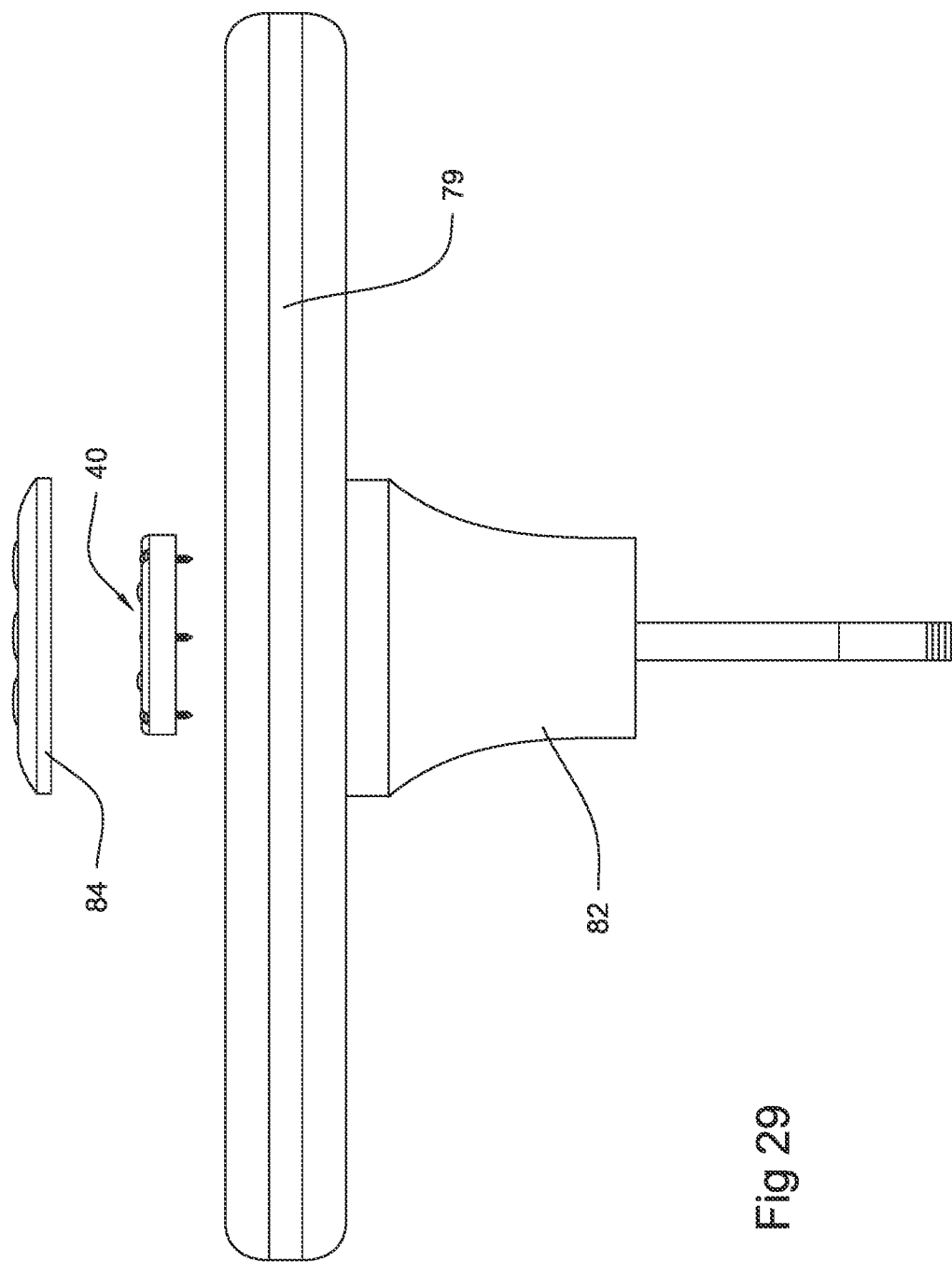
FIG. 29 is a side view of the wireless keypad controller mounted on the steering wheel of a vehicle.

As seen in FIG. 22 a preferred construction of the keypad controller 40 having a single power button 41 operatively inserted in the top cover plate 42 of controller 40 to switch the electrical distribution system 1 on or off is illustrated. As more clearly seen in FIGS. 23-25, controller 40 is shown having a "puck" style configuration although other shapes can be utilized. This configuration is particularly desired when the keypad controller 40 is to affixed in the steering wheel 79 of the recreational vehicle as seen in FIGS. 27-29.

Figure 23:
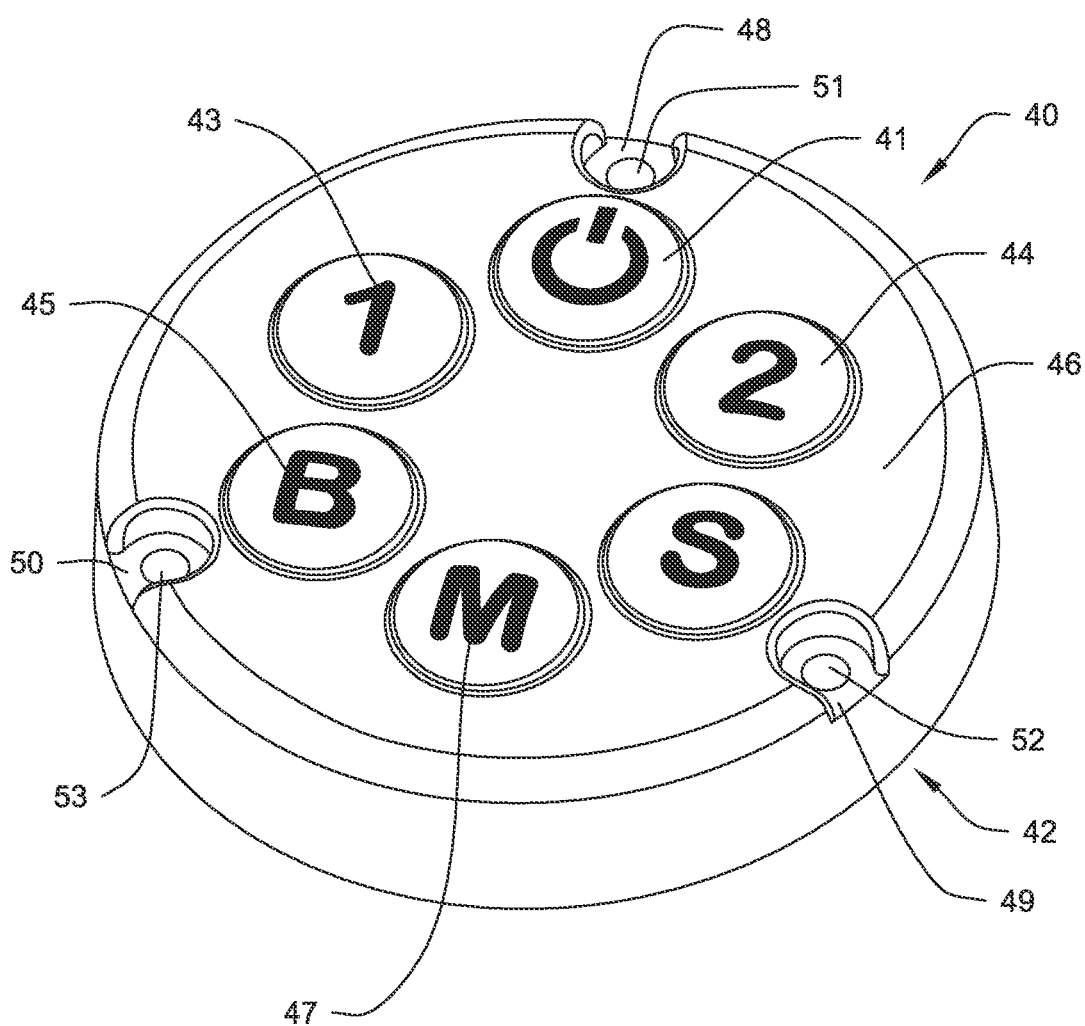
FIG. 23 is a perspective top view of a preferred embodiment of a multi-button wireless keypaid controller that can be affixed to a mount for attaching to a water craft or recreational vehicle.
Figure 24:
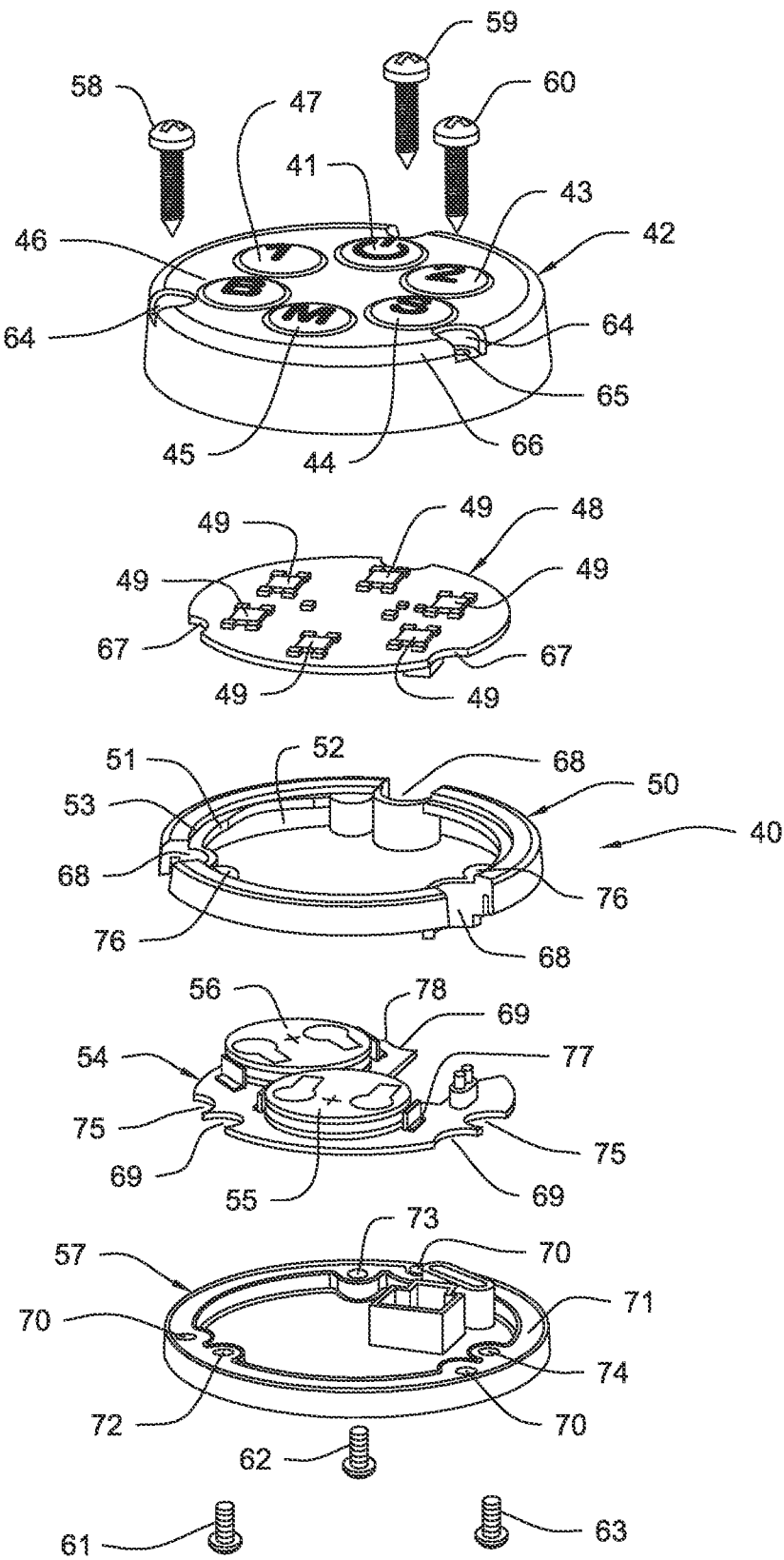
FIG. 24 is an exploded three-quarter top view of the wireless keypaid controller of FIG. 23.
Figure 25:
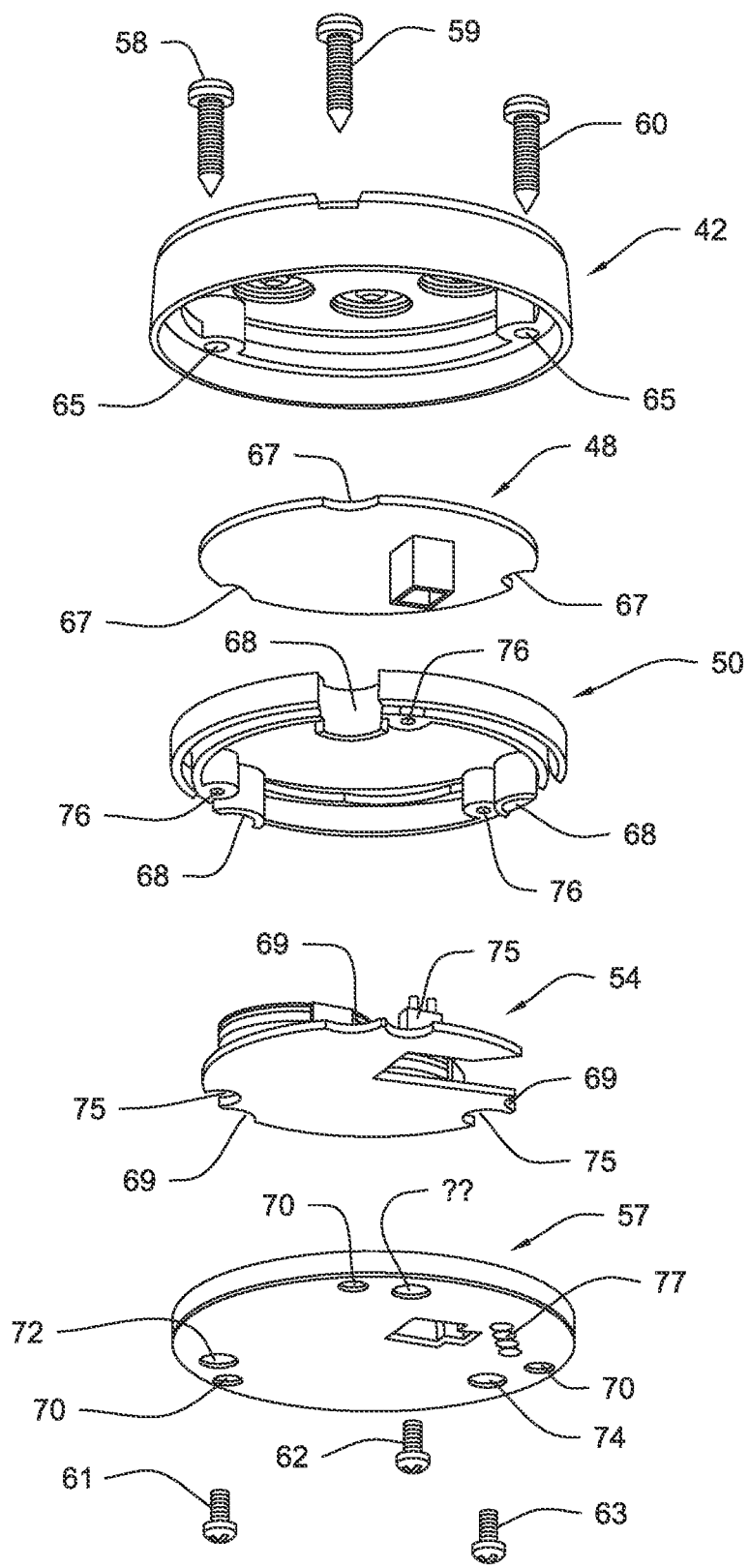
FIG. 25 is and exploded three-quarter bottom view of the wireless keypaid controller of FIG. 23.

FIGS. 23-25 illustrate the controller 40 having an "on-off" power control button 41, as well as multiple other control buttons 43-47 used to activate specific circuits in the electrical distribution system 1. In this embodiment controller 40 is constructed having five basic elements: a top cover 42, a control button contact plate 48 positioned below and having contact members 49 operatively contacting control buttons 41-47, a rubber seating ring 50 having a seating ridge 51 extending outward from the interior surface 52 of ring 50, the seating ridge having a top surface 53 on which control button contact plate 48 rests, a battery power plate 54 to which batteries 55, 56 are operatively attached to a RF transmitter (not shown) that is operatively attached to the contact members 49 to transmit a signal when one of the contact members makes contact with one of the power buttons 41, and a bottom base plate 57 on which battery power plate 54 rests.

The elements of controller 40 are affixed to one another by two sets of three screws and/or bolts: top screws 58-60 and bottom bolts 61-63. To facilitate this attachment arrangement the top cover 42 is also constructed having three screw seating niches 64, each with corresponding screw openings 65 extending through the perimeter area 66 of top cover 42. The control button contact plate 48, the rubber seating ring 50 and the battery power plate 54 have corresponding niches 67-69 that permit screws 58-60 to pass through to bottom plate 57 that has corresponding openings 70 positioned in the perimeter area 71 of bottom base plate 57 that is aligned with perimeter area 66 of top cover 42. Screws 58-60 can be threaded to secure the ring 50 and plates 42, 48, 54 and 57 to one another or to pass through and screw into a mounting surface (not shown). Bottom base plate 57 is provided with three bolt openings 72-74 positioned interior of the perimeter area 71. Bolts 61-63 extend through openings 72-74 and then through niches 75 of battery power plate 54, and finally be screwed into aligned threaded openings 76 of ring 50.

Bottom plate 57 is also provided with a series of access openings 77 to permit inserting of programing tools to modify the operation of control buttons 49.

Figure 26:
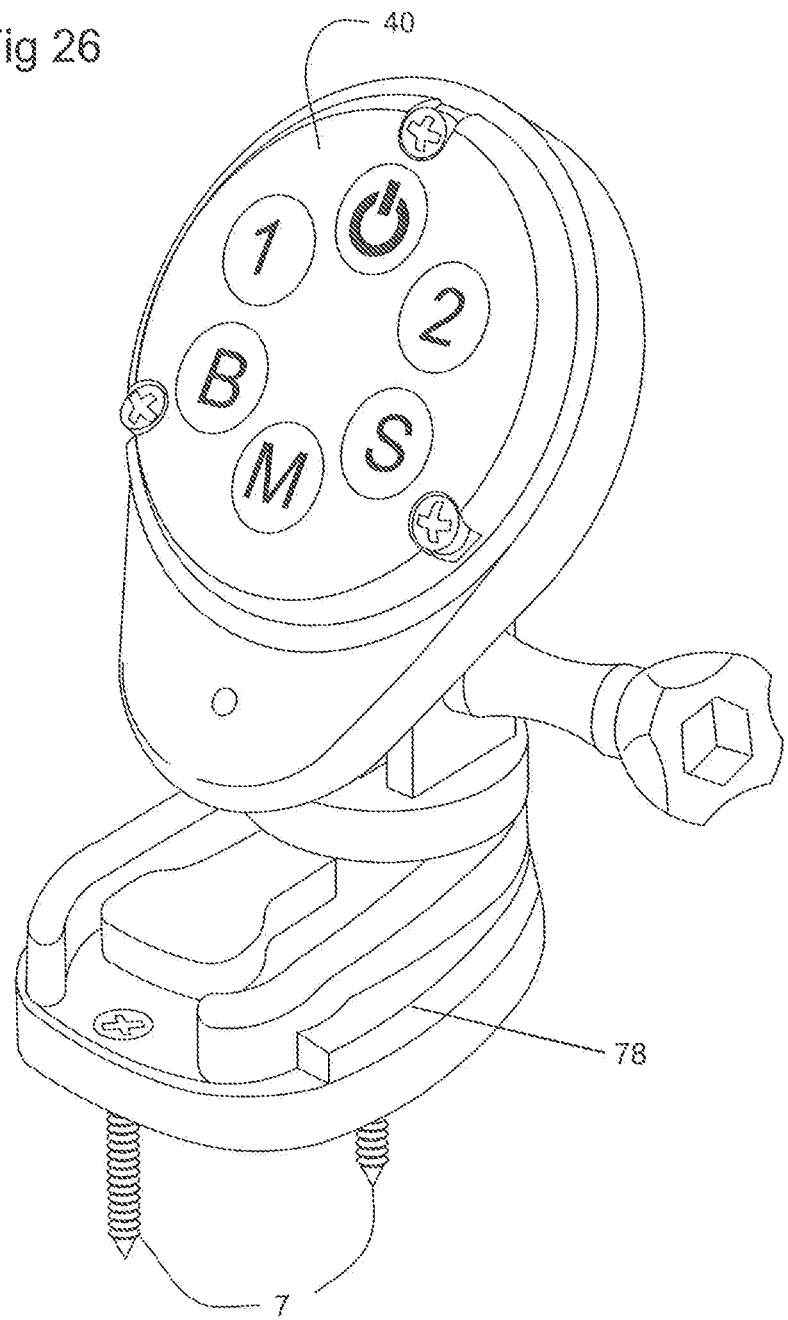
FIG. 26 is a perspective view of a wireless keypad controller that can be affixed in a mount which can be affixed to an existing surface of the water craft or recreational vehicle by screws or other securing means.

FIG. 26 illustrates puck shaped keypad controller 40 being affixed to mount 78 that can be attached by screws 7 to the surface of the water vessel or recreational vehicle.

FIGS. 27-29 illustrate puck shaped keypad controller 40 being affixed to a steering wheel 79. In this embodiment steering wheel 79 has a circular perimeter rim 80 with spokes 81 extending from hub 82 attached to the steering column 83. Spokes 81 extend to the perimeter rim 80. The hub 82 has a cavity 84 sized to permit controller 40 to be positioned in cavity 84 and held in position by securing ring member 85. Power and electronic cables to controller 40 can be provided through an passageway (not shown) in steering column 83.

Figure 30:
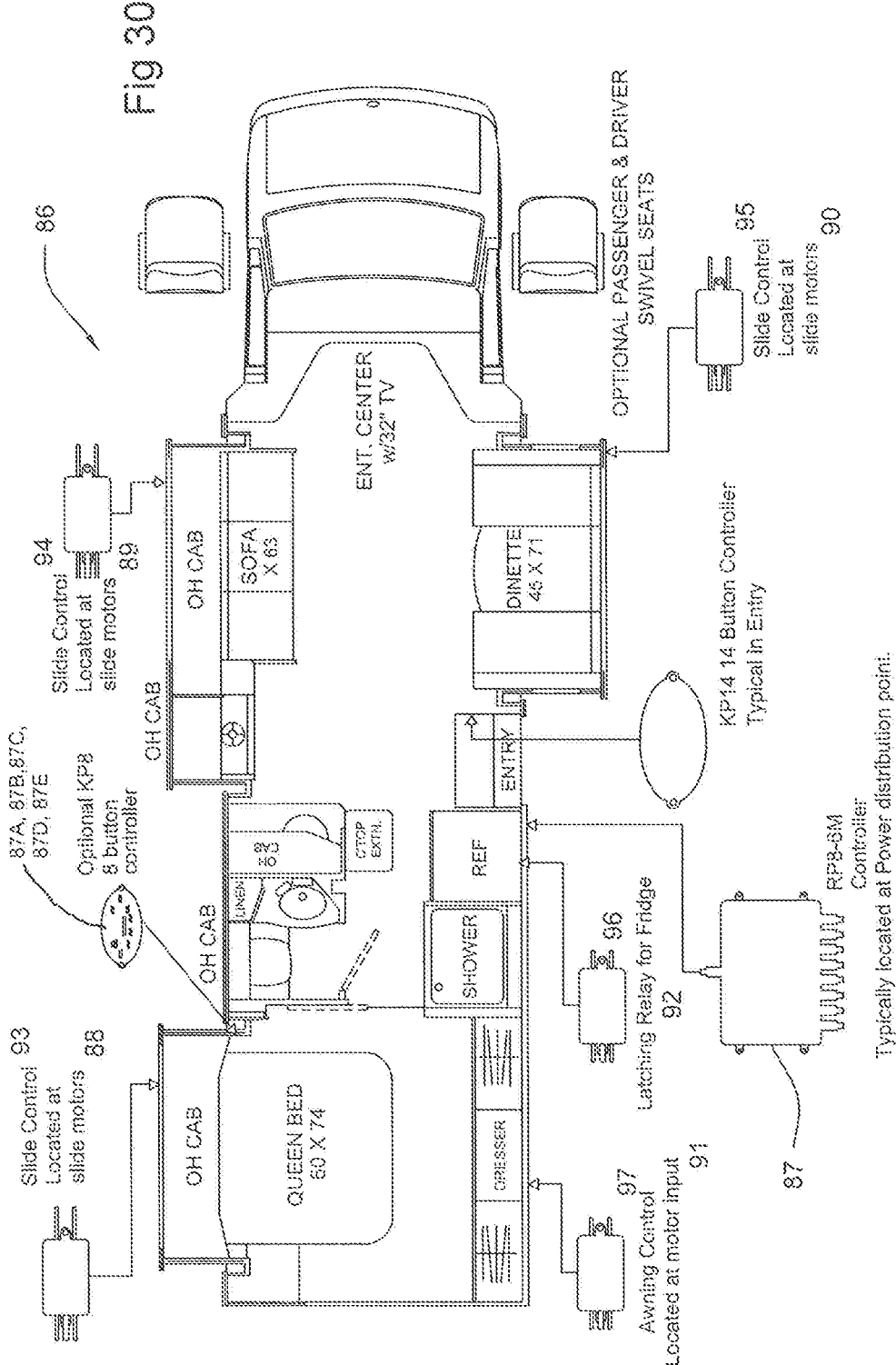
FIG. 30 is a top view of a conventional RV with its top removed illustrating where the various components of a preferred embodiment of the digital switching system used to control 12 volt devices.

FIG. 30 is a schematic of a conventional recreational vehicle 86 (commonly referred to as an RV) illustrating the placement of various components of the RV 86, the activation of which can be controlled by RP8-6M controller 87. Controller 87 may include an on-off control button 87A, a motor driven bed extension control button 87B, a motor driven sofa extension control button 87C, a motor driven dinette extension control button 87D, and a motor driven awning extension control button 87E. Each button 87A-87E is operatively connected to an RF transmitter 501 to transmit a signal that will activate the associated motor 88-92. Button 87B will activate a motor driven bed extension accessory 88 to extend the motor driven bed extension accessory 88 of the recreational vehicle. Button 87B will activate a motor driven sofa extension accessory 89 of the recreational vehicle. Button 87C will activate the motor driven dinette extension accessory 90 of the recreational vehicle. Button 87D will activate an awning extension accessory 91 of the recreational vehicle. It is preferred that the controller 87 be positioned convenient to the power distribution location of RV 86.

Figure 31:
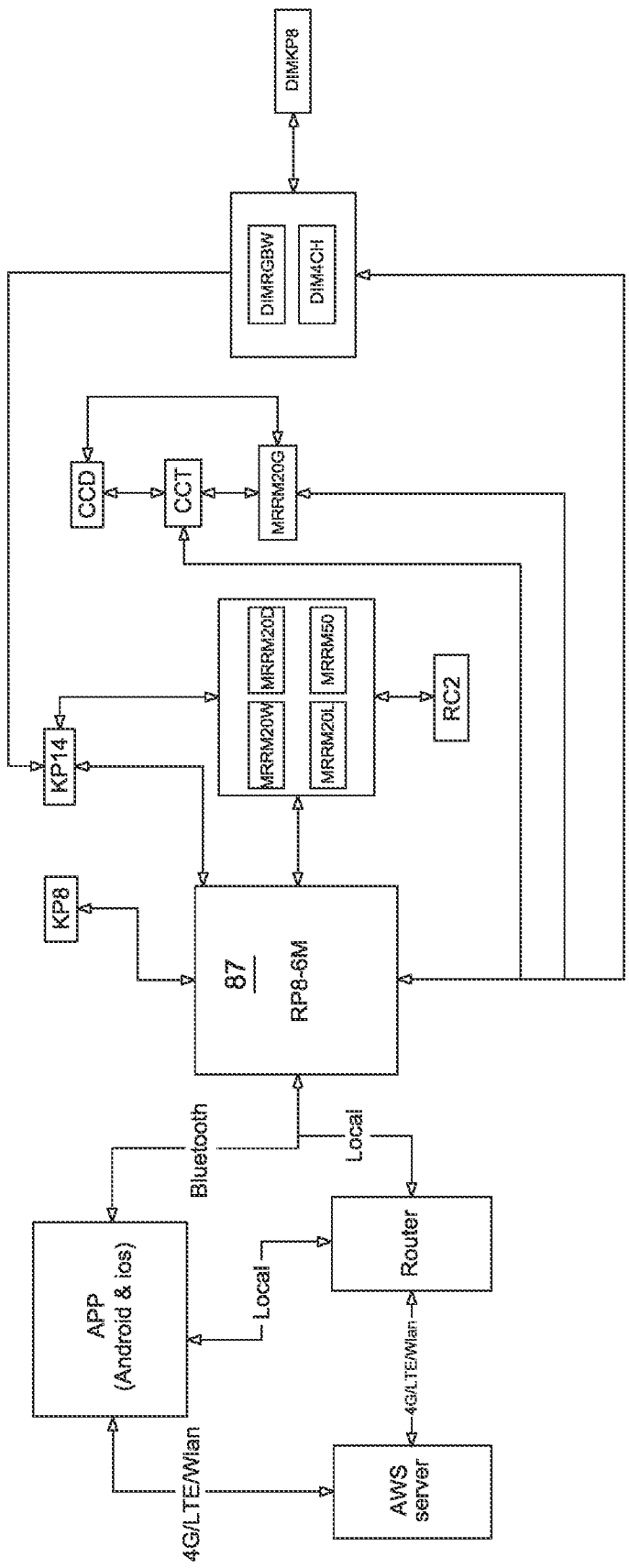
FIG. 31 is a system communication schematic diagram.
Figure 32:
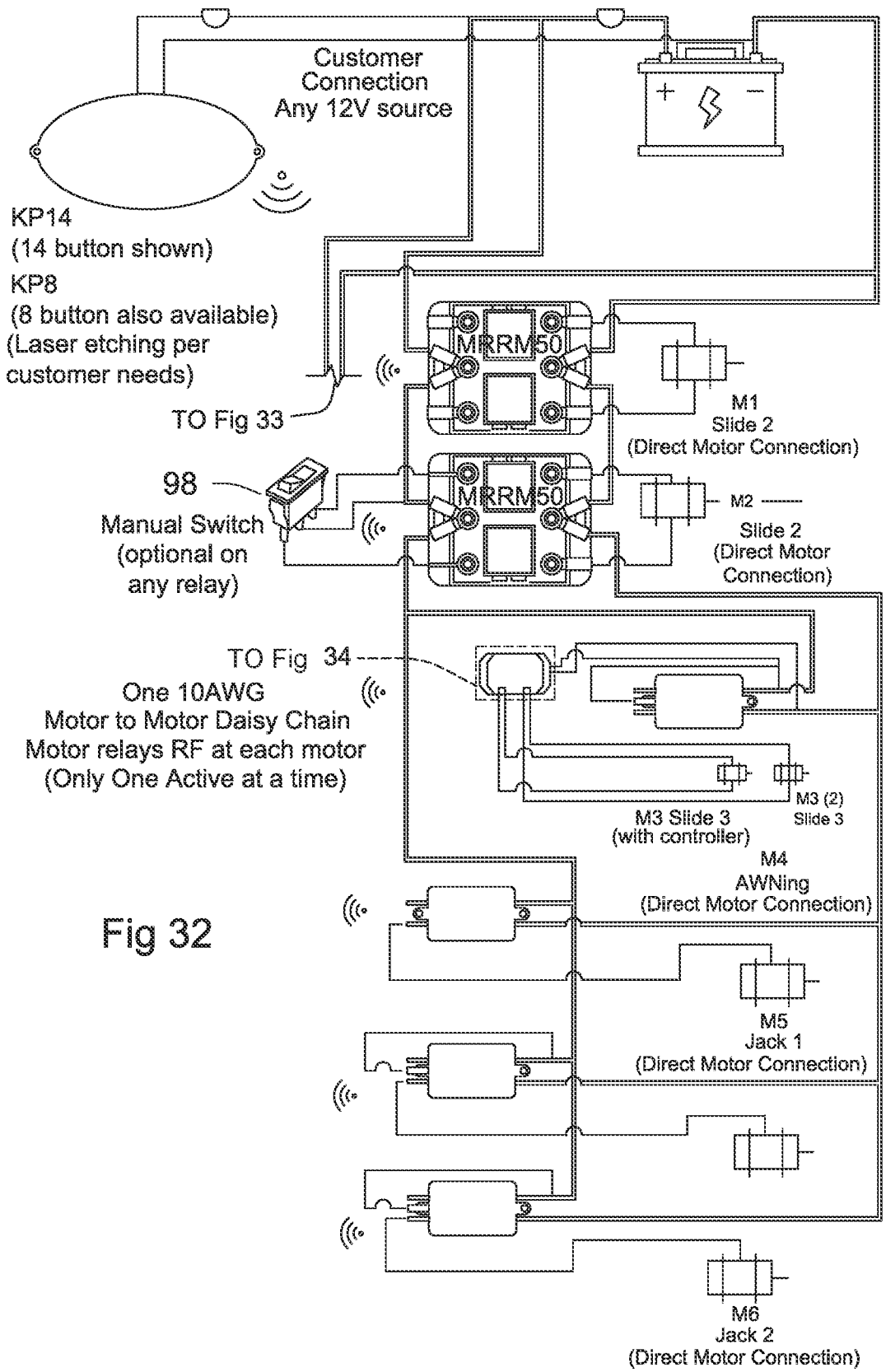
FIG. 32 illustrates the wiring of the controllers and those components which can receive a Bluetooth or WiFi signal.
Figure 33:
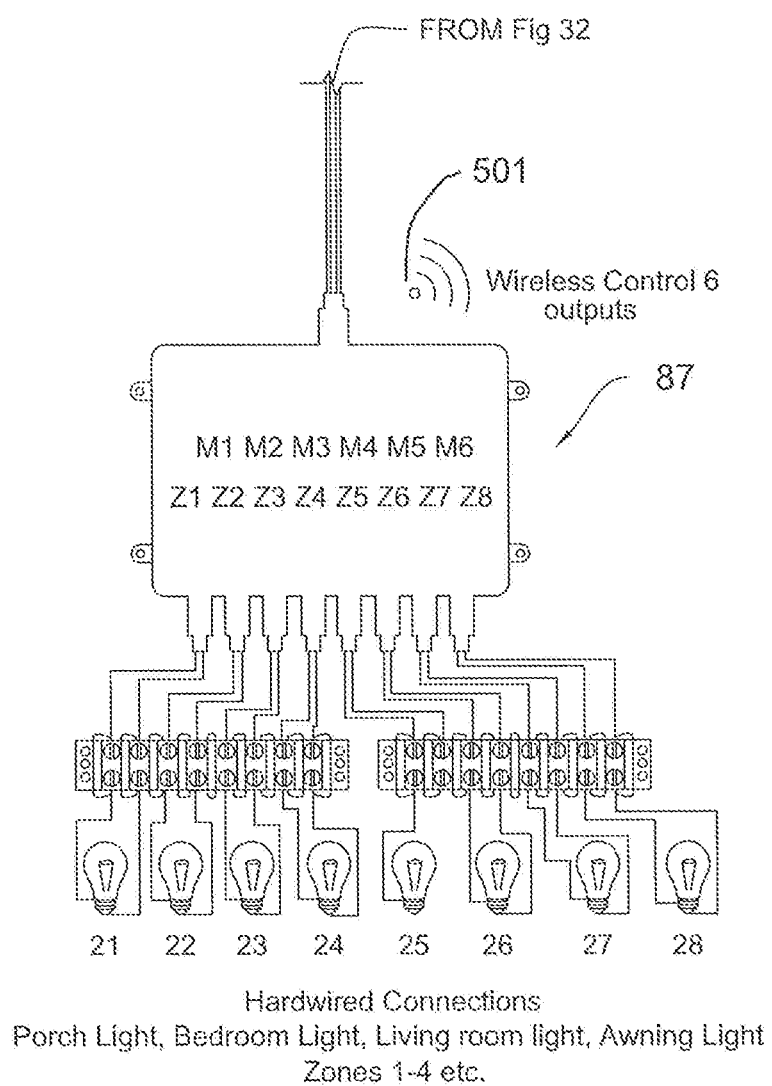
FIG. 33 is a detailed schematic view of a controller.
Figure 34:
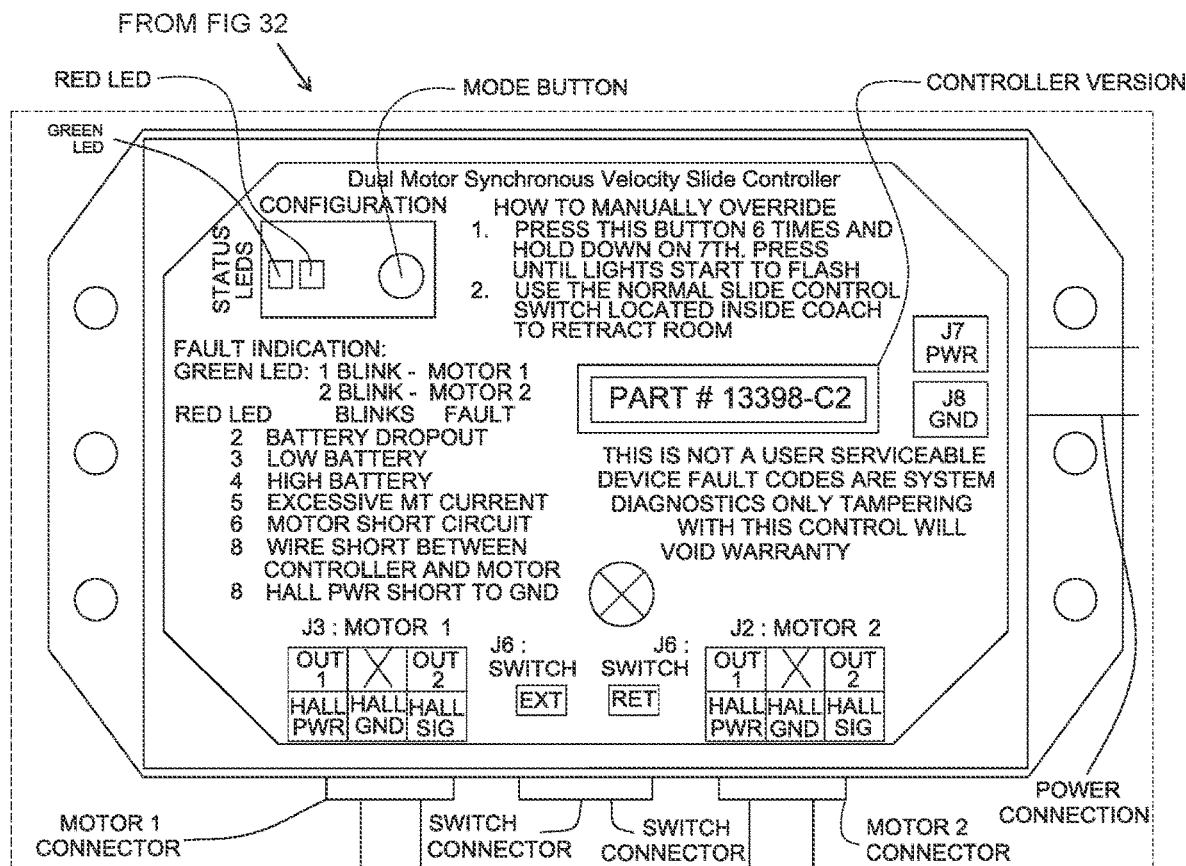
FIG. 34 is a detailed schematic view of another embodiment of a controller.

FIGS. 31-32 are schematics of the electrical distribution system 1 utilizing a smart phone app to transmit signals to the controller 87. In the configurations illustrated there are optional controllers KP14, KP8, Remote Controller RC2, DIMKP8 wireless connected and conveniently positioned within RV 86 or carried by the driver or one of the passengers. In these configurations the motors 88-92 controlling the slide controls 93-95 and 96 and the awning control 97 are connected in daisy chain fashion to permit only one motor at a time to operate. This novel feature not only significantly reduces the amount of hard wiring typical in a RV, but also prevents the tripping of the various fuses forming part of the electrical distribution system 1 causing loss of power to the various RV components.

FIG. 31 also illustrates controller DIMKP8 operatively connected to the entertainment center to activate the television controls and speakers. It also illustrates controllers CCD and CCT operatively connected to MRRM20G switch that operates the convenience center monitoring the status of the fresh, gray and black water tanks, the two battery banks and optionally one electrical generator of RV 86.

FIG. 32 illustrates a schematic wherein controller 87 is hardwired to the various lighting fixtures in the recreational vehicle (RV) 86. The controller 87 is Bluetooth or WiFi enabled to send control signals to the individual controllers operating the various slide motors shown in FIG. 30, as well as direct motor connections for the leveling jacks for the recreational vehicle (RV) 86. Also shown is an optional manual switch 98 that can be used to activate a slide motor. If desired manual switches can be used with any relay. This system can also include a KP14 controller and/or a KP8 controller preferably affixed in position at the recreational vehicle entryway or its bedroom area. These controllers can be positioned at other locations if desired. In addition one or more of these Bluetooth or WiFi enabled controllers can be provided with lanyard to enable them to be carried by or placed around the RV driver's or passengers' necks.

These and other improvements to electrical distribution systems for personal water craft, recreational vehicles, and mobile homes will be apparent to those of skill in the art from the foregoing disclosure and drawings and are intended to be encompassed by the scope and spirit of the following claims.

We claim:

1. An electrical distribution system for use with a personal water craft having a hull, a bow, and a stern, said electrical distribution system comprising:
    a power source;
    a control panel electrically connected to said power source, said control panel comprising a plurality of switches and a first microcontroller, wherein said first microcontroller is configured to recognize activation of each of said plurality of switches and to transmit a unique signal corresponding to activation of each of said plurality of switches;
    a digital switching device electrically connected to said power source, said digital switching device comprising a plurality of relay switches operatively connected to a second microcontroller, wherein said second microcontroller is configured to receive each of said unique signals and to open or close a different one of said plurality of relay switches upon receipt of each of said unique signals;
    a communication cable connecting said first microcontroller of said control panel and said second microcontroller of said digital switching device;
    a plurality of electrical outlets; and
    a plurality of power lines, wherein each of said plurality of power lines is electrically connected to said digital switching device and at least one of said plurality of electrical outlets, whereby closing one of said relay switches in said digital switching device will energize one of said plurality of power lines and at least one of said plurality of electrical outlets.

2. The electrical distribution system according to claim 1 wherein said plurality of outlets are mounted in said hull of said personal water craft.

3. The electrical distribution system according to claim 2 wherein substantially all of said plurality of power lines extending from said digital switching device to said electrical outlets are contained within said hull.

4. The electrical distribution system according to claim 1 wherein said power source comprises at least one battery.

5. The electrical distribution system according to claim 1 wherein said power source comprises a plurality of batteries.

6. The electrical distribution system according to claim 1 wherein said plurality of relay switches are solid state relay switches.

7. The electrical distribution system according to claim 1 wherein said electrical distribution system is grounded through said digital switching device to said power source.

8. The electrical distribution system according to claim 1 wherein said power lines and said digital switching device are provided with mating quick connect connections.

9. An electrical distribution system for use with a personal water craft having a hull, a bow, and a stern, said electrical distribution system comprising:
   a power source;
   at least one remote control device comprising a plurality of switches, wherein said remote control device is configured to generate and transmit a unique signal upon actuation of each of said plurality of switches;
   a digital switching device electrically connected to said power source, said digital switching device comprising a plurality of relay switches operatively connected to a microcontroller, wherein said microcontroller is configured to receive each of said unique signals transmitted by said remote control device and to open or close a different one of said relay switches upon receipt of each of said unique signals;
   a plurality of electrical outlets; and
   a plurality of power lines, wherein each of said plurality of power lines is electrically connected to said digital switching device and at least one of said plurality of electrical outlets, whereby closing one of said relay switches in said digital switching device will energize one of said plurality of power lines and at least one of said plurality of electrical outlets.

10. The electrical distribution system according to claim 9 wherein said plurality of electrical outlets are mounted in said hull of said personal water craft.

11. The electrical distribution system according to claim 9 wherein said power source comprises at least one battery.

12. The electrical distribution system according to claim 9 wherein said power source comprises a plurality of batteries.

13. The electrical distribution system according to claim 9 wherein said plurality of relay switches are solid state relay switches.

14. The electrical distribution system according to claim 9 wherein said electrical distribution system is grounded through said digital switching device to said power source.

15. The electrical distribution system according to claim 9 wherein said power lines and said digital switching device are provided with mating quick connect connections.

16. An electrical distribution system for use with a personal water craft having a hull, a bow, a stern, and a midship extending between said bow and said stern, said electrical distribution system comprising:
   a power source;
   at least one remote control device comprising a plurality of switches operatively connected to a transponder, wherein said transponder is configured to generate a unique signal associated with activation of each of said plurality of switches and to transmit each said unique signal upon activation of each of said plurality of switches;
   a digital switching device electrically connected to said power source, said digital switching device comprising a plurality of relay switches, a microcontroller operatively connected to said plurality of relay switches, and a radio frequency receiver in communication with said microcontroller, wherein said radio-frequency receiver is configured to receive each said unique signal generated by said transponder and to communicate each said signal to said microcontroller, and wherein said microcontroller is configured to open or close a different one of said plurality of relay switches upon receipt of each of said unique signals from said radio frequency receiver;
   a plurality of power lines, wherein each of said plurality of power lines is electrically connected to one of said plurality of relay switches, whereby closing said relay switch will connect one of said power lines to said power source and energize said power line and opening said relay switch will disconnect one of said power lines from said power source; and
   a plurality of electrical outlets, wherein each of said plurality of outlets is electrically connected to one of said plurality of power lines, whereby energizing one of said plurality of power lines will energize at least one of said plurality of outlets.

17. The electrical distribution system according to claim 16 wherein said plurality of outlets are mounted in said hull of said personal water craft.

18. The electrical distribution system according to claim 17 wherein said plurality of power lines extending from said digital switching device to said outlets are contained within said hull.

19. The electrical distribution system according to claim 16 wherein said power source comprises at least one battery.

20. The electrical distribution system according to claim 16 wherein said power source comprises a plurality of batteries.

21. The electrical distribution system according to claim 16 wherein said plurality of relay switches are solid state relay switches.

22. The electrical distribution system according to claim 16 wherein said electrical distribution system is grounded through said digital switching device to said power source.

23. The electrical distribution system according to claim 16 wherein said plurality of power lines and said digital switching device are provided with mating quick connect connections.

24. An electrical distribution system for use with a personal water craft having a hull, a bow, and a stern, said electrical distribution system comprising:
   a power source;
   a control panel, said control panel comprising a plurality of switches wherein said control panel is configured to generate and transmit a unique signal corresponding to activation of each of said plurality of switches;
   a digital switching device in digital communication with said control panel and electrically connected to said power source, said digital switching device comprising a plurality of relay switches, wherein said digital switching device is configured to receive each of said unique signals and to open or close a different one of said plurality of relay switches upon receipt of each of said unique signals;
   a plurality of electrical outlets; and
   a plurality of power lines, wherein each of said plurality of power lines is electrically connected to said digital switching device and at least one of said plurality of electrical outlets, whereby closing one of said relay switches in said digital switching device will energize one of said plurality of power lines and at least one of said plurality of electrical outlets.

25. The electrical distribution system according to claim 24, wherein said control panel further comprises a transponder configured to generate said unique signal associated with activation of each of said plurality of switches and to transmit each said unique signal upon activation of each of said plurality of switches.

26. The electrical distribution system according to claim 25 wherein said digital switching device further comprises a microcontroller configured to actuate one of said plurality of relay switches corresponding to each of said unique signals.

27. The electrical distribution system according to claim 24, wherein the control panel is electrically connected to said power source.

28. The electrical distribution system according to claim 24, wherein the control panel has a second power source.

29. The electrical distribution system according to claim 24 wherein said plurality of relay switches are solid state relay switches.

30. The electrical distribution system according to claim 24 wherein said electrical distribution system is grounded through said digital switching device to said power source.

* * * * *